United States Patent
Nakayama et al.

(10) Patent No.: US 9,715,041 B2
(45) Date of Patent: *Jul. 25, 2017

(54) OPTICAL FILM, POLARIZING PLATE PROTECTIVE FILM, POLARIZING PLATE AND LIQUID CRYSTAL DISPLAY DEVICE

(71) Applicant: FUJIFILM Corporation, Tokyo (JP)

(72) Inventors: Hajime Nakayama, Kanagawa (JP); Shusuke Arita, Kanagawa (JP); Yutaka Nozoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 14/867,448

(22) Filed: Sep. 28, 2015

(65) Prior Publication Data

US 2016/0091630 A1    Mar. 31, 2016

(30) Foreign Application Priority Data

Sep. 30, 2014   (JP) .................. 2014-202475

(51) Int. Cl.
| | |
|---|---|
| *C09K 19/00* | (2006.01) |
| *G02B 1/04* | (2006.01) |
| *C08J 5/18* | (2006.01) |
| *G02F 1/1335* | (2006.01) |
| *G02B 1/14* | (2015.01) |

(52) U.S. Cl.
CPC ........ *G02B 1/04* (2013.01); *C08J 5/18* (2013.01); *C08J 2333/14* (2013.01); *C08J 2421/00* (2013.01); *C08J 2433/00* (2013.01); *G02B 1/14* (2015.01); *G02F 1/133528* (2013.01); *Y10T 428/10* (2015.01); *Y10T 428/1036* (2015.01); *Y10T 428/1041* (2015.01)

(58) Field of Classification Search
CPC .......... G01B 1/04; C08J 5/18; C08J 2333/06–2333/12; C08J 2421/00; C08J 2413/00; B29C 55/02; B29C 47/0021; B29D 11/0073; B32B 27/00; G02F 1/133528; G02F 1/13363; G02F 2201/50; Y10T 28/10; Y10T 28/1036; Y10T 28/1041; Y10T 28/105
USPC ............. 428/1.1, 1.3, 1.31, 1.33, 522, 523; 525/228; 349/96, 117; 359/489.01, 359/489.02; 264/1.34
See application file for complete search history.

(56) References Cited

U.S. PATENT DOCUMENTS

2008/0158490 A1* 7/2008 Nakayama .............. B29C 55/08
                                                        349/117
2009/0135483 A1   5/2009 Asano et al.

FOREIGN PATENT DOCUMENTS

| JP | S63-034190 A | 2/1988 |
|---|---|---|
| JP | 2008-009378 A | 1/2008 |
| JP | 2009-292869 A | 12/2009 |
| JP | 2011016323 A * | 1/2011 |
| JP | 2013-91803 A | 5/2013 |
| JP | 2013091803 A * | 5/2013 |

OTHER PUBLICATIONS

Notification of Reasons for Refusal issued by the Japanese Patent Office on May 16, 2017, in connection with Japanese Patent Application No. 2014-202475.

* cited by examiner

*Primary Examiner* — Ruiyun Zhang
(74) *Attorney, Agent, or Firm* — Edwards Neils LLC; Jean C. Edwards

(57) ABSTRACT

There is provided an optical film including a (meth)acrylic resin having a cyclic structure in its main chain as a main component, a compound represented by Formula (1) below, and a rubber elastic body:

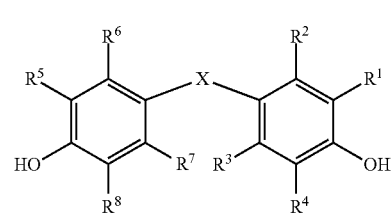

Formula (1)

where each of $R^1$ to $R^8$ independently represents a hydrogen atom, a halogen atom, a hydroxyl group or a hydrocarbon group having 1 to 12 carbon atoms, X represents a divalent alicyclic group having 4 to 20 carbon atoms, and the alicyclic group represented by X may have at least one substituent selected from a halogen atom, an aliphatic hydrocarbon group having 1 to 12 carbon atoms and an aromatic hydrocarbon group having 6 to 15 carbon atoms.

10 Claims, No Drawings

OPTICAL FILM, POLARIZING PLATE PROTECTIVE FILM, POLARIZING PLATE AND LIQUID CRYSTAL DISPLAY DEVICE

CROSS-REFERENCE TO RELATED APPLICATIONS

This application claims priority from Japanese Patent Application No. 2014-202475, filed on Sep. 30, 2014, the contents of all of which are hereby incorporated by reference in their entirety.

BACKGROUND OF THE INVENTION

1. Field of the Invention

A demand for a liquid crystal display device has been expanded in applications such as a liquid crystal display for an LCD TV or a personal computer. In general, the liquid crystal display device is constituted by a liquid crystal cell and two polarizing plates provided at both sides thereof, in which the liquid crystal cell is obtained by interposing, for example, a transparent electrode, a liquid crystal layer, and a color filter between glass plates. Each polarizing plate is constituted by two optical films (polarizing plate protective films) having a polarizer (which may be referred to as a polarization film) interposed therebetween.

2. Description of the Related Art

Meanwhile, according to a recent advance in a technology, upsizing of the liquid crystal display device has been accelerated, and at the same time, applications of the liquid crystal display device have been diversified. For example, the liquid crystal display device may be used as a large display installed on the street or in front of a shop or may be used for an advertising display using a display equipment called a digital signage in a public place.

In such applications, since an outdoor usage is envisaged, a deterioration caused by moisture adsorption of a polarizing film may be a problem. Thus, it is required to reduce a moisture permeability of the polarizing plate protective film. As for a material having low moisture permeability, a (meth)acrylic resin may be exemplified. The (meth)acrylic resin is low in moisture permeability and further shows an excellence in transparency or dimensional stability, and thus is used for an optical film.

In particular, as shown in Japanese Patent Laid-Open Publication No. 2013-91803, the (meth)acrylic resin having a ring structure in its main chain has been effectively used.

In addition, Japanese Patent Laid-Open Publication No. 2013-91803 discloses a method of manufacturing a (meth) acrylic resin composition by an extruder, in which the (meth)acrylic resin composition may include a rubber component.

SUMMARY OF THE INVENTION

However, when used as the polarizing plate protective film, the (meth)acrylic resin film is required to be further moisture-impermeable. When the present inventors manufactured an (meth)acrylic resin film by a method disclosed in Japanese Patent Laid-Open Publication No. 2013-91803 described above, it was found that a sufficiently low moisture permeability cannot be obtained.

In view of the above described situation, an object to be solved by the present invention is to provide an optical film which is low in a moisture permeability and is excellent in a heat resistance and a brittleness.

Also, another object of the present invention is to provide a polarizing plate protective film, a polarizing plate and a liquid crystal display device which have the optical film.

The present inventors have conducted intensive studies. As a result, they found that in an optical film containing a (meth)acrylic resin which has a cyclic structure in its main chain as a main component, a compound having a specific structure which includes two or more phenolic hydroxyl groups and an alicyclic structure is used so that the film has a similar cyclic structure to the resin and thus it easily becomes compatible with the resin. A rubber elastic body is also used so as to achieve the above described object and to complete the present invention.

That is, problems to be solved by the present invention may be solved by the present invention which is a following means.

[1] An optical film comprising:
a (meth)acrylic resin having a cyclic structure in its main chain as a main component,
a compound represented by Formula (1) below, and
a rubber elastic body:

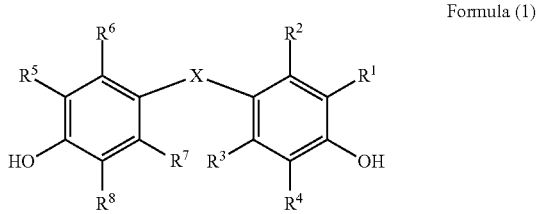

Formula (1)

wherein
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms, and the alicyclic group represented by X may have at least one substituent selected from a halogen atom, an aliphatic hydrocarbon group having 1 to 12 carbon atoms and an aromatic hydrocarbon group having 6 to 15 carbon atoms.

[2] The optical film according to [1],
wherein the rubber elastic body is a (meth)acrylic rubber.

[3] The optical film according to [1] or [2],
wherein each of $R^2$, $R^3$, $R^4$, $R^6$, $R^7$ and $R^8$ in Formula (1) represents a hydrogen atom.

[4] The optical film according to any one of [1] to [3],
wherein each of $R^1$ and $R^5$ in Formula (1) independently represents a hydrogen atom or a methyl group.

[5] The optical film according to any one of [1] to [4],
wherein X in Formula (1) is represented by Formula (X1) or Formula (X2) below:

Formula (X1)

wherein in Formula (X1),
each of $R_{11}$ to $R_{18}$ independently represents a hydrogen atom or a hydrocarbon group having 1 to 6 carbon atoms, at least two of $R_{11}$ to $R_{18}$ may be linked to each other to form an alicyclic ring having 8 or less carbon atoms, and
* represents a binding site:

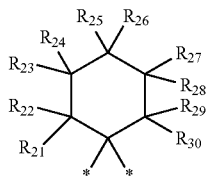

Formula (X2)

wherein in Formula (X2),
each of $R_{21}$ to $R_{30}$ independently represents a hydrogen atom or a hydrocarbon group having 1 to 6 carbon atoms, at least two of $R_{21}$ to $R_{30}$ may be linked to each other to form an alicyclic ring having 8 or less carbon atoms, and
* represents a binding site.

[6] The optical film according to [5],
wherein each of $R_{11}$ to $R_{18}$ in Formula (X1) and $R_{21}$ to $R_{30}$ in Formula (X2) independently represents a hydrogen atom or a methyl group.

[7] The optical film according to any one of [1] to [6],
wherein the (meth)acrylic resin having a cyclic structure in its main chain has at least one cyclic structure selected from the following Formulas (101) to (104) below:

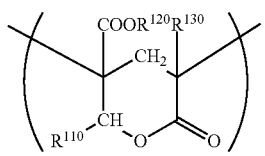

Formula (101)

wherein in Formula (101),
each of $R^{110}$, $R^{120}$ and $R^{130}$ independently represents a hydrogen atom or an alkyl group having 1 to 20 carbon atoms, and the alkyl group may further have an oxygen atom:

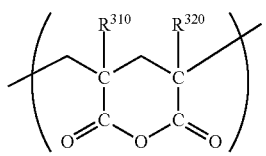

Formula (102)

wherein in Formula (102),
each of $R^{310}$ and $R^{320}$ independently represents a hydrogen atom or an alkyl group having 1 to 20 carbon atoms, and the alkyl group may have an oxygen atom:

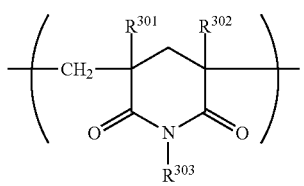

Formula (103)

wherein in Formula (103),
each of $R^{301}$, $R^{302}$ and $R^{303}$ independently represents a hydrogen atom or an unsubstituted or substituted alkyl group having 1 to 12 carbon atoms, a cycloalkyl group or an aryl group:

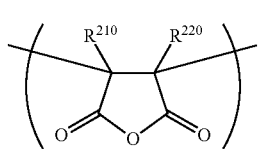

Formula (104)

wherein in Formula (104),
each of $R^{210}$ and $R^{220}$ independently represents a hydrogen atom or an organic residue having 1 to 20 carbon atoms.

[8] A polarizing plate protective film having the optical film according to any one of [1] to [6].
[9] A polarizing plate having the polarizing plate protective film according to [8].
[10] A liquid crystal display device provided with the polarizing plate according to [9].

The present invention may provide an optical film which is low in a moisture permeability and is excellent in a heat resistance and a brittleness. Also, the present invention may provide a polarizing plate protective film, a polarizing plate and a liquid crystal display device which employ the optical film of the present invention.

DETAILED DESCRIPTION OF THE INVENTION

Hereinafter, the present invention will be described in detail. The descriptions of the constituent features described below may be made based on representative exemplary embodiments or specific examples of the present invention, but the present invention is not limited to the exemplary embodiments. Also, in the present specification, a numerical range expressed by using "to" means a range including numerical values described before and after "to" as a lower limit and an upper limit.

<Optical Film>

An optical film of the present invention is an optical film containing a (meth)acrylic resin having a cyclic structure in its main chain as a main component, and contains a compound represented by Formula (1) below, and a rubber elastic body.

Meanwhile, "containing a (meth)acrylic resin having a cyclic structure in its main chain as a main component" indicates that a (meth)acrylic resin is contained in an amount of 50% by mass or more, based on the mass of the optical film.

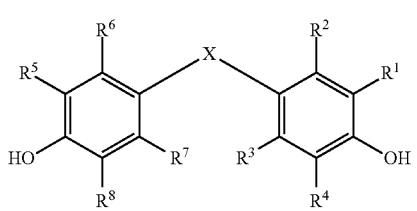

Formula (1)

Each of $R^1$ to $R^8$ independently represents a hydrogen atom, a halogen atom, a hydroxyl group or a hydrocarbon group having 1 to 12 carbon atoms. X represents a divalent alicyclic group having 4 to 20 carbon atoms. An alicyclic group represented by X may have at least one substituent selected from a halogen atom, an aliphatic hydrocarbon group having 1 to 12 carbon atoms, and an aromatic hydrocarbon group having 6 to 15 carbon atoms.

[(Meth)acrylic Resin Having a Cyclic Structure in its Main Chain]

A (meth)acrylic resin of the present invention has a repeating structural unit derived from the (meth)acrylic ester monomer as a repeating structural unit and a ring structure in its main chain.

The "(meth)acrylic resin" may be "an acrylic resin", "a methacrylic resin", or a copolymer of "an acrylic resin" and "a methacrylic resin", or may contain another structural unit to be described later.

Examples of the (meth)acrylic ester may include acrylic acid esters such as methyl acrylate, ethyl acrylate, n-butyl acrylate, isobutyl acrylate, t-butyl acrylate, cyclohexyl acrylate, benzyl acrylate; methacrylic acid esters such as methyl methacrylate, ethyl methacrylate, propyl methacrylate, n-butyl methacrylate, isobutyl methacrylate, t-butyl methacrylate, cyclohexyl methacrylate, benzyl methacrylate; and the like, and these may be used alone or in a combination of two or more kinds thereof. Among these, from the viewpoint that the heat-resistant and the transparency are excellent, methyl methacrylate is particularly preferred.

In addition, by introducing a ring structure in the (meth) acrylic resin of the present invention in its main chain, it is possible to increase the rigidity of the main chain and to improve the heat resistance.

In the present invention, among the (meth)acrylic resin having a ring structure in its main chain, it is preferable that the any one of a polymer containing lactone ring structure in its main chain, a polymer containing anhydrous glutaric acid ring structure in its main chain, a polymer having a glutarimide ring structure in its main chain, and anhydrous maleic acid-based polymer having a succinic anhydride ring. Among them, a polymer containing lactone ring structure in its main chain or a polymer having a glutarimide ring structure in its main chain is more preferred.

Hereinafter, a (meth)acrylic resin having a ring structure in its main chain will be sequentially described.

(1) (Meth)acrylic Resin Having Lactone Ring Structure in its Main Chain

A (meth)acrylic resin having lactone ring structure in its main chain (also called "an lactone ring-containing polymer") is not particularly limited to a (meth) acrylic resin if it has a lactone ring in its main chain, but preferably, the resin has a lactone ring structure represented by the following Formula (101).

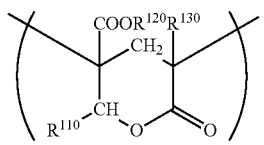

Formula (101)

In Formula (101), $R^{110}$, each of $R^{120}$ and $R^{130}$ independently represents a hydrogen atom or an alkyl group having 1 to 20 carbon atoms. An alkyl group may further have an oxygen atom.

Here, among the alkyl groups having 1 to 20 carbon atoms, an alkyl group having 1 to 6 carbon atoms is preferred, and specifically methyl group, ethyl group, isopropyl group, n-butyl group, t-butyl group, and the like are preferred.

The content of the lactone ring structure represented by the above Formula (101) in the lactone ring-containing polymer structure is preferably 5 to 90% by mass, more preferably 10 to 70% by mass, far more preferably 10 to 60% by mass, and particularly preferably 10 to 50% by mass. When the content of the lactone ring structure is 5% by mass or more, the heat resistance and surface hardness of the obtained polymer tend to be improved and when the content of the lactone ring structure is 90% by mass or less, the molding processability of the obtained polymer tends to be improved. (In this specification, mass ratio is equal to weight ratio.)

Meanwhile, the content of the lactone ring structure can be calculated from the following equation.

Content (% by mass) of the lactone ring = $B \times A \times M_R / M_m$

In the equation, B is the mass content of the monomer composition used in the above described copolymerization of the monomer raw material having a structure (hydroxyl group) participating in the lactone cyclization, $M_R$ is the formula amount of the lactone ring structural unit generated, $M_m$ is the molecular weight of the raw material monomer having a structure (hydroxyl group) participating in lactone cyclization, and A is the lactone cyclization ratio.

In addition, for example, if the cyclization is accompanied by the de-alcohol reaction, the lactone cyclization rate can be calculated from the weight depreciating heat weight reduction ratio by the de-alcohol reaction between from 150° C. before the theoretical weight reduction and weight reduction starts to 300° C. before the degradation of the polymer starts.

As for the manufacturing method of the (meth)acrylic resin having the lactone ring structure, known methods described in Japanese Patent Laid-Open Publication No. 2006-096960, Japanese Patent Laid-Open Publication No. 2007-063541 and the like can be used.

The weight average molecular weight of the lactone ring-containing polymer is preferably 10,000 to 2,000,000, more preferably 20,000 to 1,000,000, and particularly preferably 50,000 to 500,000.

The glass transition temperature (Tg) of the lactone ring-containing polymer preferably ranges from 115° C. to 180° C., more preferably from 120° C. to 170° C., and particularly from 125° C. to 160° C.

(2) Polymer Having Anhydrous Glutaric Acid Ring Structure in its Main Chain

A polymer having an anhydrous glutaric acid ring structure in its main chain is a polymer having a glutaric acid anhydride unit.

A polymer having a glutaric acid anhydride unit has preferably a glutaric acid anhydride unit (also called "a glutaric acid anhydride unit") represented by the following Formula (102).

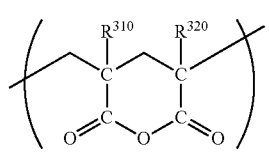

Formula (102)

In Formula (102), each of $R^{310}$ and $R^{320}$ independently represents a hydrogen atom or an alkyl group having 1 to 20 carbon atoms. Meanwhile, an alkyl group may further have an oxygen atom. Preferably, each of $R^{310}$ and $R^{320}$ independently represents a hydrogen atom or an alkyl group having 1 to 5 carbon atoms.

A polymer having a glutaric acid anhydride unit is preferably a (meth)acrylic resin containing a glutaric acid anhydride unit. As for a (meth)acrylic resin, in terms of the heat resistance, it is desirable to have the glass transition temperature (Tg) of 120° C. or more.

The glass transition temperature (Tg) of the polymer having an anhydrous glutaric acid ring structure in its main chain preferably ranges from 110° C. to 160° C., more preferably from 115° C. to 160° C., and particularly from 120° C. to 160° C.

Moreover, the weight average molecular weight of the polymer having anhydrous glutaric acid ring structure in its main chain preferably ranges from 50,000 to 500,000.

The content of the glutaric acid anhydride unit for the (meth) acrylic resin is preferably 5 to 50% by mass and more preferably 10 to 45% by mass. When the content is 5% by mass or more or more preferably 10% by mass or more, it is possible to obtain the effect of improving heat resistance and further to obtain the effect of improving weather resistance.

As for the manufacturing method of the polymer having an anhydrous glutaric acid ring structure in its main chain, methods described in Japanese Patent Laid-Open Publication No. 2009-210905, Japanese Patent Laid-Open Publication No. 2009-030001 and the like can be used.

(3) (Meth)acrylic Resin Having a Glutarimide Ring Structure in its Main Chain

A (meth)acrylic resin having a glutarimide ring structure in its main chain (also called "a glutarimide-based resin") has a glutarimide ring structure in its main chain so as to express the desired balance of properties in view of optical properties or heat resistance or the like. A (meth)acrylic resin having the above described glutarimide ring structure in its main chain preferably contains the glutarimide resin having 20% by mass or more of the glutarimide unit represented by at least the following Formula (103).

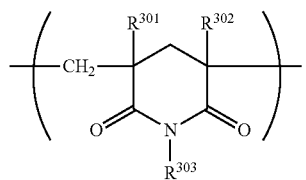

Formula (103)

In Formula (103), each of $R^{301}$, $R^{302}$ and $R^{303}$ independently represents a hydrogen atom or a linear or branched alkyl group having 1 to 12 carbon atoms, a cycloalkyl group, an aryl group, —OAc group or —CN group. Ac represents an acetyl group.

As for the preferred glutarimide unit constituting the glutarimide-based resin used in the present invention, each of $R^{301}$ and $R^{302}$ is a hydrogen atom or a methyl group, $R^{303}$ is a methyl group or a cyclohexyl group. The glutarimide unit may be a single kind, or $R^{301}$, $R^{302}$ and $R^{303}$ may include a plurality of different types.

The preferred second constituent unit configuring the glutarimide-based resin used in the present invention is a unit comprising of an acrylic ester or methacrylic acid ester.

The preferred constituent unit of acrylic esters or methacrylic acid esters includes methyl acrylate, ethyl acrylate, methyl methacrylate, ethyl methacrylate and the like. In addition, as another preferred imidation possible unit, N-alkylmethacrylamide such as N-methylmethacrylamide or N-ethylmethacrylamide and the like can be exemplified. These second constituent unit may be a single type, or may include a plurality of the types.

The content of the glutarimide unit represented by Formula (103) in the glutarimide-based resin is preferably 20% by mass or more and 95% by mass or less based on the total repeating unit of the glutarimide-based resin. It is more preferably 50 to 90% by mass, and far more preferably 60 to 80% by mass. When the content of the glutarimide unit is 20% by mass or more, it is preferable in terms of heat resistance and transparency of the obtained film. When it is 95% by mass or less, it is preferable in terms of brittleness, transparency, and film formation of the film.

The glutarimide-based resin may also be, if necessary, the one in which the third constituent unit may be copolymerized. As an example of preferred third constituent unit, a constituent unit formed by copolymerization of styrene-based monomer such as styrene, substituted styrene, α-methylstyrene and the like, acryl-based monomer such as butyl acrylate and the like, nitrile-based monomer such as acrylonitrile or methacrylonitrile and the like, and maleimide-based monomer such as maleimide, N-methyl maleimide, N-phenyl maleimide, N-cyclohexyl maleimide and the like may be used. These may be directly copolymerized with the above described glutarimide unit and the imidation possible unit in the glutarimide-based resin, and also graft copolymerized with respect to the resin having the above described glutarimide unit and the imidation possible unit. The content of the third component, when it is added, in the glutarimide-based resin is preferably 5 mol % or more and 30 mol % or less, based on the total repeating unit in the glutarimide-based resin.

As described in U.S. Pat. No. 3,284,425, U.S. Pat. No. 4,246,374, Japanese Patent Laid-Open Publication No. 2-153904 and the like, the resin obtained by using the methyl methacrylate ester as a main raw material can be used as a resin having an imidation possible unit, and the resin having the imidation possible unit can be obtained by imidation using an ammonia or a substituted amine.

The glass transition temperature (Tg) of the above described glutarimide-based resin preferably ranges from 110° C. to 160° C., more preferably from 115° C. to 160° C., and particularly from 120° C. to 160° C.

In addition, the weight average molecular weight of the glutarimide-based resin preferably ranges from 50,000 to 500,000.

(4) Anhydrous Maleic Acid-based Polymer Having a Succinic Anhydride Ring in its Main Chain The (meth) acrylic resin in the present invention may include an anhydrous maleic acid-based polymer having a succinic anhydride ring in its main chain, if the content is in the range satisfying the optical characteristics conditions of the optical film of the present invention.

An anhydrous succinic acid structure in its main chain is formed in the molecular chains of the polymer (in the main backbone of the polymer) so that high heat resistance is given to the (meth)acrylic resin as a copolymer and glass transition temperature (Tg) can be even higher.

The glass transition temperature (Tg) of the anhydrous maleic acid-based polymer having a succinic anhydride ring in its main chain preferably ranges from 110° C. to 160° C., more preferably from 115° C. to 160° C., and particularly from 120° C. to 160° C.

In addition, the weight average molecular weight of the anhydrous maleic acid-based polymer having a succinic anhydride ring in its main chain preferably ranges from 50,000 to 500,000.

The above described anhydrous maleic acid unit used in the copolymerization with the above described (meth) acrylic resin is not particularly limited, but maleic acid modified resins described in each of Japanese Patent Laid-Open Publication No. 2008-216586, Japanese Patent Laid-Open Publication No. 2009-052021, Japanese Patent Laid-Open Publication No. 2009-196151, and Japanese Patent Publication 2012-504783 can be exemplified.

Meanwhile, these are not intended to limit the present invention.

In addition, the method for manufacturing a (meth) acrylic resin containing an anhydrous maleic acid unit can use a known method without limitation particularly.

As the above described maleic acid modified resin, it is not limited to a resin as long as an anhydrous maleic acid unit is included in the resulting polymer, and examples thereof may include an (anhydrous) maleic acid modified MS resin, an (anhydrous) maleic acid modified MAS resin (methyl methacrylate-acrylonitrile-styrene copolymer), an (anhydrous) maleic acid modified MBS resin, an (anhydrous) maleic acid modified AS resin, an (anhydrous) maleic acid modified AA resin, an (anhydrous) maleic acid modified ABS resin, an ethylene-anhydrous maleic acid copolymer, an ethylene-acrylic acid-anhydrous maleic acid copolymer, an anhydrous maleic acid graft polypropylene and the like.

The above described anhydrous maleic acid unit is a structure represented by the following Formula (104).

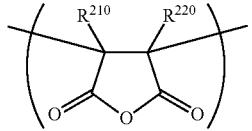

Formula (104)

In the above described Formula (104), each of $R^{210}$ and $R^{220}$ independently represents a hydrogen atom or an organic residue having 1 to 20 carbon atoms.

The above described organic residue is not particularly limited, but if it has carbon atoms in the range of 1 to 20 carbon atoms. For example, the residue includes a linear or branched alkyl group, a linear or branched alkylene group, an aryl group, —OAc group, —CN group and the like. Moreover, the organic residue may contain an oxygen atom. Ac represents an acetyl group.

The number of carbon atoms of the above described $R^{210}$ and $R^{220}$ is preferably 1 to 10, and more preferably from 1 to 5.

When the $R^{210}$ and $R^{220}$ represent a hydrogen atom, respectively, in view of adjusting the intrinsic birefringence, it is also preferable to further include other copolymerization components. As such a ternary or more heat resistance (meth) acrylic resin, for example, a methyl methacrylate-anhydrous maleic acid-styrene copolymer can be preferably used.

An optical film according of the present invention may be mixed with other resins other than a (meth) acrylic resin. The mass ratio of the (meth)acrylic resin to other resins is preferably 96:4 to 100:0, more preferably 97:3 to 100:0, far more preferably 98:2 to 100:0, and most preferably 100:0. When the mass ratio of the (meth)acrylic resin to other resins is in a range of 96:4 to 100:0, since the moisture permeability is low and the degradation of Tg of the resin is suppressed, the film is preferred.

A "weight average molecular weight (Mw)" in the present invention refers to a weight average molecular weight measured by gel permeation chromatography.

The weight average molecular weight of the (meth)acrylic resin having a cyclic structure in its main chain is not particularly limited, but in order to sufficiently exhibit the effect of the present invention, the weight average molecular weight of the (meth)acrylic resin preferably ranges from 1,000 to 2,000,000, and more preferably from 80,000 to 250,000.

When the weight average molecular weight of the (meth)acrylic resin having a cyclic structure in its main chain is 80,000 or more, even in a case where the concentration of the resin is low (e.g., 10% by mass) in a composition (dope composition) for forming the optical film by solution film formation, the viscosity of the dope composition may be high. Thus, it is possible to suppress streaks from entering a casting film during ejection from a casting die. Moreover, when the weight average molecular weight (Mw) of the (meth)acrylic resin having a cyclic structure in its main chain is 80,000 or more, a breaking elongation of the film of the present invention in an unstretched state is elongated, and thus a handling suitability is excellent during film production.

In addition, when the weight average molecular weight of the (meth)acrylic resin having a cyclic structure in its main chain is 250,000 or less, preferably it is suitable for the melted film formation.

A "weight average molecular weight (Mw)" in the present invention refers to a weight average molecular weight measured by gel permeation chromatography under the following conditions.

Solvent tetrahydrofuran
Device name TOSOH HLC-8220GPC
Column three columns (TOSOH TSKgel Super HZM-H (4.6 mm×15 cm)) are connected in use.
Column temperature 25° C.
Sample concentration 0.1% by mass
Flow rate 0.35 ml/min
Calibration curve calibration curves made with 7 samples of TSK standard polystyrene manufactured by TOSOH (Mw=2800000 to 1050) were used.

[Other Resins]

The optical film of the present invention may contain resins other than the above described (meth)acrylic resin having a cyclic group in its main chain in a range not impairing the effect of the present invention.

Examples of such resins may include olefin-based thermoplastic resins such as polyethylene, polypropylene, ethylene-propylene copolymer, and poly(4-methyl-1-pentent); halogen-containing thermoplastic resins such as vinyl chloride, and chlorinated vinyl resin; acrylic thermoplastic resins such as polymethyl methacrylate; styrene-based thermoplastic resins such as polystyrene, styrene-methyl methacrylate copolymer, styrene-acrylonitrile copolymer, and acrylonitrile butadiene-styrene block copolymer; polyesters such as polyethylene terephthalate, polybutylene terephthalate, and polyethylene naphthalate; polyamides such as nylon6, nylon66, and nylon610; polyacetal; polycarbonate; polyphenylene oxide; polyphenylene sulfide; polyether ether ketone;

polysulfone; polyether sulfone; polyoxybenzylene; polyamide imide; and rubber polymers such as an ABS resin or an ASA resin blended with polybutadiene-based rubber and acrylic rubber. In the present invention, as resins other than the (meth)acrylic resin having a cyclic group in its main chain, a cellulose resin such as cellulose acylate is not included.

When a resin other than the (meth)acrylic resin having a cyclic group in its main chain is contained in the optical film, the resin to be added may be placed in a compatible state, or may be mixed without being dissolved.

[Compound Represented by Formula (1)]

The optical film of the present invention contains a compound represented by Formula (1).

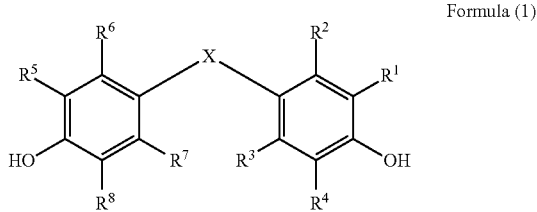

Formula (1)

Each of $R^1$ to $R^8$ independently represents a hydrogen atom, a halogen atom, a hydroxyl group or a hydrocarbon group having 1 to 12 carbon atoms. X represents a divalent alicyclic group having 4 to 20 carbon atoms. An alicyclic group represented by X may have at least one substituent selected from a halogen atom, an aliphatic hydrocarbon group having 1 to 12 carbon atoms, and an aromatic hydrocarbon group having 6 to 15 carbon atoms.

In Formula (1), each of $R^1$ to $R^8$ independently represents a hydrogen atom, a halogen atom, a hydroxyl group or a hydrocarbon group having 1 to 12 carbon atoms. As for the halogen atom, a fluorine atom, a chlorine atom, a bromine atom or an iodine atom is preferred, and a fluorine atom or a chlorine atom is more preferred. As for the hydrocarbon group having 1 to 12 carbon atoms, an alkyl group, an alkenyl group, an alkynyl group, and an aryl group may be exemplified. As for the alkyl group having 1 to 12 carbon atoms, a linear, branched or cyclic alkyl group may be exemplified, and specifically, a methyl group, an ethyl group, an isopropyl group, a n-butyl group, an i-butyl group, a s-butyl group, a t-butyl group, a n-hexyl group, and a cyclohexyl group are preferred. As for the aryl group, a phenyl group, and a naphthyl group may be exemplified, and a phenyl group is preferred.

In view of the compatibility and moisture permeability, each of $R^2$, $R^3$, $R^4$, $R^6$, $R^7$ and $R^8$ preferably represents a hydrogen atom.

In view of being able to manufacture a film having a low moisture permeability due to interaction with a(meth)acrylic resin, it is desirable that each of $R^1$ and $R^5$ independently represents a hydrogen atom or a methyl group.

In Formula (1), X represents a divalent alicyclic group having 4 to 20 carbon atoms. Here, a "divalent alicyclic group" refers to a divalent linking group having an alicyclic ring, which represents a group having two bonds to one of carbon atoms which constitute the alicyclic ring.

The divalent alicyclic group having 4 to 20 carbon atoms, which is represented by X, is preferably an alicyclic group having 4 to 15 carbon atoms, and more preferably an alicyclic group having 5 to 12 carbon atoms.

Specifically, as for X, cyclobutyl, cyclopentyl, cyclohexyl, cyclooctyl, norbornane, decahydronaphthalene, and tricyclo[5.2.1.0(2,6)]decane are preferred, and cyclopentyl, cyclohexyl, norbornane, and tricyclo[5.2.1.0(2,6)]decane are more preferred.

The alicyclic group represented by X may have a structure in which an aromatic ring is fused with an alicyclic ring.

The alicyclic group represented by X may have at least one substituent selected from a halogen atom, an aliphatic hydrocarbon group having 1 to 12 carbon atoms, and an aromatic hydrocarbon group having 6 to 15 carbon atoms. As for the halogen atom, a fluorine atom, a chlorine atom, a bromine atom or an iodine atom is preferred, and a fluorine atom or a chlorine atom is more preferred. As for the alkyl group having 1 to 12 carbon atoms, a linear, branched or cyclic alkyl group may be exemplified, and specifically, a methyl group, an ethyl group, an isopropyl group, a t-butyl group, a cyclopentyl group and a cyclohexyl group are preferred. As for the aromatic hydrocarbon group having 6 to 15 carbon atoms, a phenyl group, and a naphthyl group are preferred, and a phenyl group is more preferred.

In view of being able to manufacture a film having a lower moisture permeability, it is particularly preferable that X in Formula (1) is represented by Formula (X1) or Formula (X2) below.

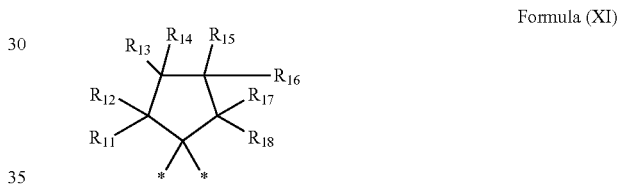

Formula (X1)

In Formula (X1), each of $R_{11}$ to $R_{18}$ independently represents a hydrogen atom or a hydrocarbon group having 1 to 6 carbon atoms. At least two of $R_{11}$ to $R_{18}$ may be linked to each other to form an alicyclic ring having 8 or less carbon atoms. * represents a binding site.

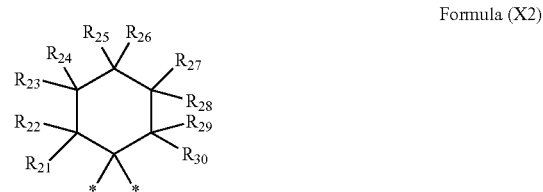

Formula (X2)

In Formula (X2), each of $R_{21}$ to $R_{30}$ independently represents a hydrogen atom or a hydrocarbon group having 1 to 6 carbon atoms. At least two of $R_{21}$ to $R_{30}$ may be linked to each other to form an alicyclic ring having 8 or less carbon atoms. * represents a binding site.

In Formula (X1), each of $R_{11}$ to $R_{18}$ independently represents a hydrogen atom or a hydrocarbon group having 1 to 6 carbon atoms. As for the hydrocarbon group having 1 to 6 carbon atoms, an alkyl group, an alkenyl group, an alkynyl group, and an aryl group may be exemplified. As for the alkyl group, a linear, branched or cyclic alkyl group may be exemplified, and specifically, a methyl group, an ethyl group, an isopropyl group, a t-butyl group, a cyclopentyl group, and a cyclohexyl group are preferred. As for the aryl group, a phenyl group may be exemplified.

At least two of $R_{11}$ to $R_{18}$ may be linked to each other to form an alicyclic ring having 8 or less carbon atoms. As for the alicyclic ring having 8 or less carbon atoms, a cyclopentane ring, and a cyclohexane ring are preferred.

In view of being able to manufacture a film having a lower haze, it is preferable that each of $R_{11}$ to $R_{18}$ in Formula (X1) and each of $R_{21}$ to $R_{30}$ in Formula (X2) independently represents a hydrogen atom or a methyl group.

Specific examples of the compound represented by Formula (1) are as follows, but the present invention is not limited thereto.

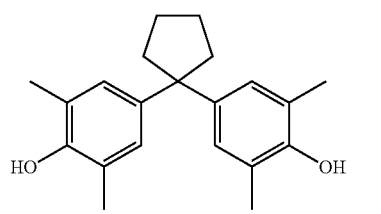

A-1

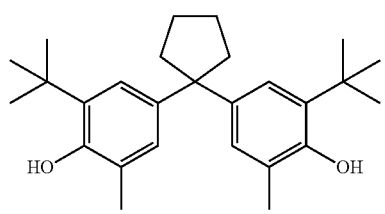

A-2

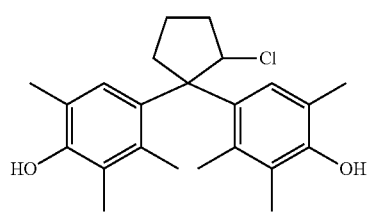

A-3

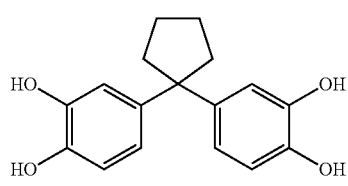

A-4

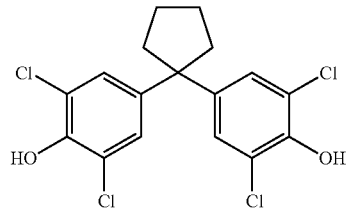

A-5

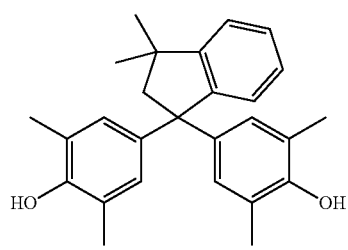

A-6

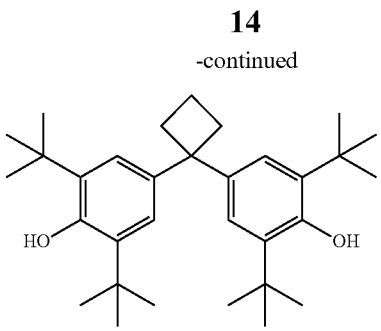

A-7

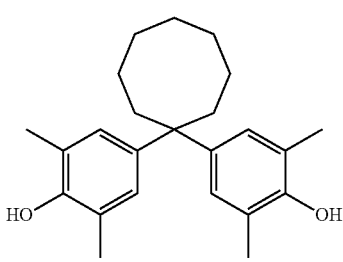

A-8

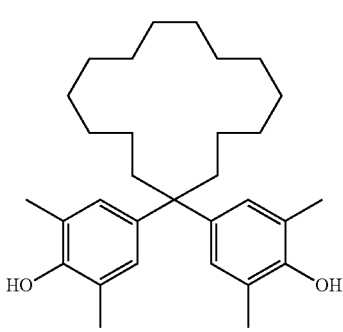

A-9

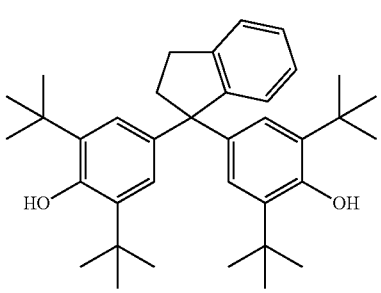

A-10

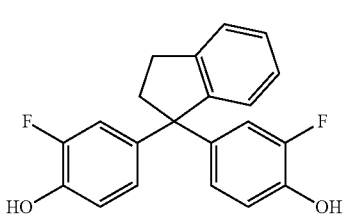

A-11

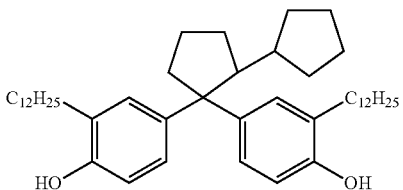

A-12

A-13
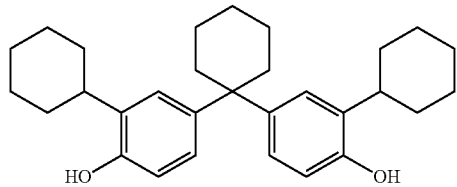
A-14
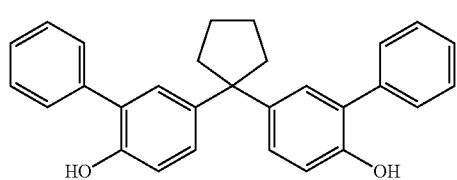
A-15
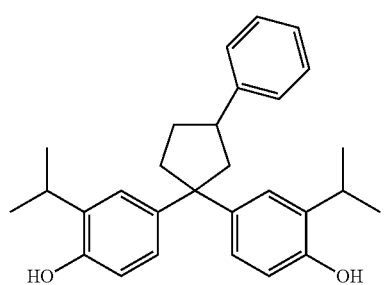
A-16
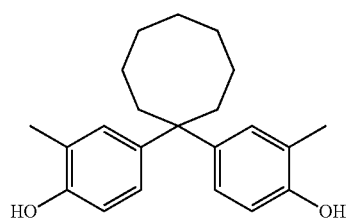
A-17
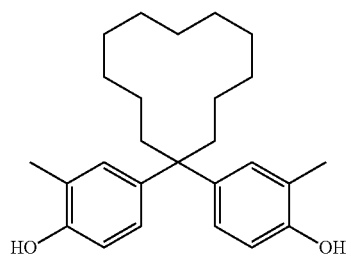
A-18
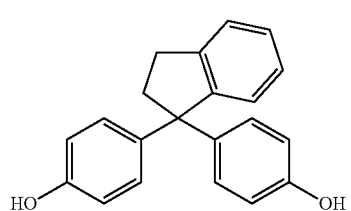
A-19
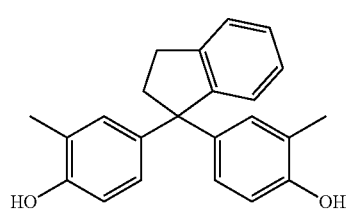
A-20
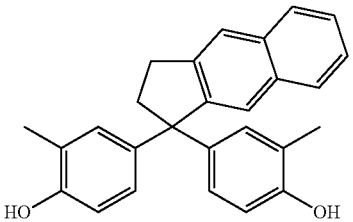
A-21
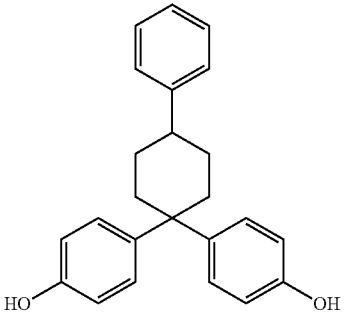
A-22
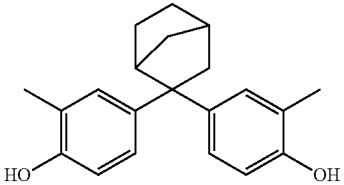
A-23
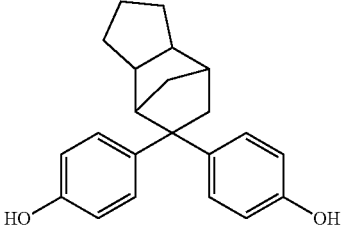
A-24
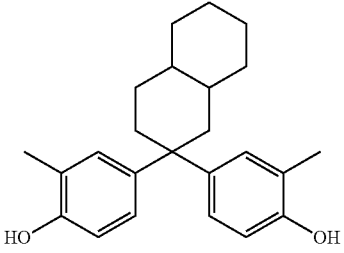
A-25
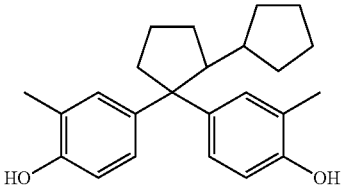

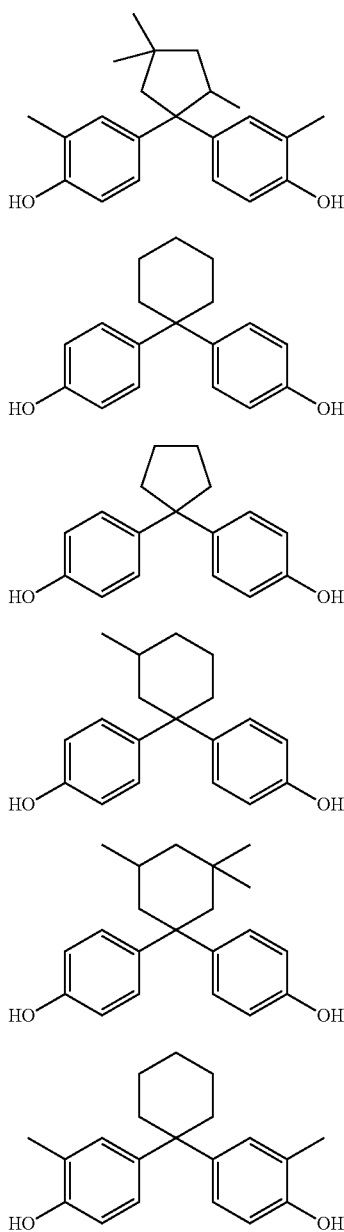

(Method of Producing Compound represented by Formula (1))

A compound represented by Formula (1) may be obtained by a conventionally known method in which cycloalkyl ketones and phenols are subjected to dehydrating condensation in the presence of an acid catalyst. In the dehydrating condensation reaction, as for the acid catalyst, for example, a mineral acid such as hydrochloric acid, hydrogen chloride gas, and sulfuric acid, a methanesulfonic acid, and a solid acid are appropriate.

(Content of Compound Represented by Formula (1))

Since the present invention has compatibility due to a cyclic structure on both sides of the compound represented by Formula (1) and the (meth) acrylic resin, even though a large amount of the compound represented by Formula (1) is added, the haze is not increased. Thus, by adjusting the added amount of the compound of formula (1), it is possible to obtain a desirable low moisture permeability without reducing the Tg of the added resin.

In the optical film of the present invention, in view of the moisture permeability, the content of the compound represented by Formula (1) is preferably 3 parts by mass or more, and more preferably 8 parts by mass or more, based on 100 parts by mass of (meth)acrylic resin having a cyclic structure in its main chain. In addition, in view of the compatibility, the content is preferably 50 parts by mass or less, and more preferably 40 parts by mass or less, based on 100 parts by mass of (meth)acrylic resin having a cyclic structure in its main chain.

[Rubber Elastic Body]

The optical film of the present invention contains a rubber elastic body. The content of the rubber elastic body preferably ranges from 5% to 30% by mass, more preferably from 5% to 25% by mass, and further preferably from 5% to 20% by mass, based on the mass of the optical film. It is desirable that the content of the rubber elastic body is within the above described range, because a brittleness may be improved without increasing a haze.

The rubber elastic body in the present invention is not particularly limited, but may be a compatible type rubber elastic body or a dispersion type rubber elastic body having a nano-particle structure. Particularly, in view of compatibility or dispersibility, a (meth)acrylic rubber is preferred.

[(Meth)acrylic Rubber]

In the present invention, a (meth)acrylic rubber is not particularly limited as long as it is a (meth)acrylic polymer which is rubbery at room temperature. However, in view of transparency and strength, rubber particles having a form of multi-layered structure particles are preferred. Multi-layered structure particles refer to particles having a multi-layered structure such as a two-layered structure including a core-shell structure, a three-layered structure including a center hard layer, a soft layer, and an outermost hard layer, and a four-layered structure further having an intermediate hard layer between the soft layer and the outermost hard layer.

The (meth)acrylic rubber particles having the two-layered structure refer to rubber particles having a core-shell structure including a core layer composed of a rubbery polymer and a shell layer composed of a (meth)acrylic glassy polymer. In the (meth)acrylic rubber particles having the two-layered structure, since the rubbery polymer is used for the core layer and acts as a concentration point of stress, a trimming property of the optical film is improved. Also, since the (meth)acrylic glassy polymer is used for the shell layer, the compatibility of the rubber particles with a matrix resin ((meth)acrylic resin) is improved, and thus the dispersibility of the rubber particles in the resin is improved.

The rubbery polymer used for the core layer is not particularly limited as long as it is rubbery at room temperature. For example, a rubbery polymer mainly composed of butadiene (e.g., a butadiene homopolymer, or a butadiene-aromatic vinyl copolymer) or a rubbery polymer mainly composed of (meth)acrylic acid alkyl ester (e.g., a butylacrylate-styrene copolymer, or a 2-ethyl hexyl acrylate-styrene copolymer) may be used. Among these, in view of strength, productivity and transparency, a butylacrylate-styrene copolymer is preferred.

The glassy polymer used for the shell layer is not particularly limited as long as it is a (meth)acrylic polymer that is glassy at room temperature. For example, a methyl methacrylate homopolymer, or a methyl methacrylate-methyl acrylate copolymer may be used.

As for the acrylic rubber particles having the two-layered structure, rubber particles disclosed in, for example, Japanese Patent Laid-Open Publication No. S53-58554 and Japanese Patent Laid-Open Publication No. S55-94917 may be used.

(Meth)acrylic rubber particles having the three-layered structure or the four-layered structure refer to rubber particles having a multi-layered structure in which a soft layer composed of a rubbery polymer, and a hard layer composed of a glassy polymer are laminated in three or more layers. The rubbery polymer used for the soft layer and the glassy polymer used for the hard layer may be the same as those exemplified above in the (meth)acrylic rubber particles having the two-layered structure.

As for the (meth)acrylic rubber particles having the three-layered structure or the four-layered structure, for example, rubber particles disclosed in the following publications may be used.

Example 1: Japanese Examined Patent Application Publication No. S60-17406

Acrylic rubber particles having a multi-layered structure obtained by a method of manufacturing a multi-layered structure acrylic resin molding material in which a molecular weight of a third layer becomes gradually smaller toward the outside from the inside.

The method includes: (A) a first layer forming step of carrying out emulsion polymerization of methyl methacrylate alone or a mixture of methyl methacrylate and a monomer copolymerizable with methyl methacrylate so as to form a dispersion of the polymer mainly composed of methyl methacrylate with a glass transition point of 25° C. or more, (B) a second layer forming step in which to the resultant product described above, a mixture which mainly contains alkyl acrylate that forms a copolymer having a glass transition point of 25° C. or less when polymerized alone, at least one of a monomer copolymerizable with this and a polyfunctional cross-linking agent, and 0.1% to 5% by mass of a polyfunctional grafting agent based on the total mass of the mixture is added, followed by emulsion polymerization, and (C) a third layer forming step in which to the resultant product described above, a methyl methacrylate or a monomer mixture mainly composed of methyl methacrylate which forms a polymer having a glass transition point of 25° C. or more when polymerized alone is added, in which a chain transfer agent is sequentially increased, followed by emulsion polymerization in multi stages.

Example 2: Japanese Patent Laid-Open Publication No. H8-245854

Acrylic multi-layered structure polymer powder including coagulated powder obtained by coagulating an emulsified latex of an acrylic multi-layered structure polymer which has at least one soft polymer layer and a hard polymer layer. The soft layer includes a polymer in which a melting start temperature of the polymer is 235° C. or more, and a glass transition temperature (Tg) is 25° C. or less when polymerized alone in an inner layer, and the hard layer includes a polymer in which a Tg is 50° C. or more when polymerized alone in the outermost layer. In the powder, a ratio of fine powder is 40% by mass in which a particle diameter of the dried coagulated powder is 212 µm or less, and a porosity volume is 0.7 cc or less per unit area in which the pore diameter of the dried coagulated powder measured by a mercury porosimetry is 5 µm or less.

Example 3: Japanese Examined Patent Application Publication No. H7-68318

A multi-layered structure acrylic polymer including (A) 25% to 45% by mass of an innermost hard layer polymer obtained by polymerizing a monomer mixture which includes 90% to 99% by mass of methyl methacrylate, 1% to 10% by mass of alkyl acrylate in which an alkyl group has 1 to 8 carbon atoms, and 0.01% to 0.3% by mass of a graft-linking monomer copolymerizable with them which includes at least one kind selected from aryl, methallyl and crotyl ester of α,β-unsaturated carboxylic acid, (B) 35% to 45% by mass of a soft layer polymer obtained by polymerizing a monomer mixture which includes 70% to 90% by mass of n-butylacrylate, 10% to 30% by mass of styrene, and 1.5% to 3.0% by mass of a graft-linking monomer copolymerizable with them which includes at least one kind selected from aryl, methallyl and crotyl ester of α,β-unsaturated carboxylic acid, in the presence of the innermost hard layer polymer, and (C) 20% to 30% by mass of an outermost hard layer polymer obtained by polymerizing a monomer mixture which includes 90% to 99% by mass of methyl methacrylate in which an alkyl group has 1 to 8 carbon atoms, in the presence of the polymer formed of the innermost hard layer and the soft layer, in which (D) a mass ratio of soft layer polymer/(innermost hard layer polymer+soft layer polymer) ranges from 0.45 to 0.57, and (E) an average particle diameter ranges from 0.2 µm to 0.3 When the multi-layered structure acrylic polymer is fractionated with acetone, (F) the grafting ratio ranges from 20% to 40% by mass, and (G) the tensile elastic modulus of the acetone insoluble portion ranges from 1000 kg/m$^2$ to 4000 kg/m$^2$.

In addition, acrylic rubber particles having a three-layered structure or a four-layered structure, for example, (meth) acrylic rubber particles disclosed in Japanese Examined Patent Application Publication No. S55-27576, Japanese Examined Patent Application Publication No. S58-1694, Japanese Examined Patent Application Publication No. S59-36645, Japanese Examined Patent Application Publication No. S59-36646, Japanese Examined Patent Application Publication No. S62-41241, Japanese Patent Laid-Open Publication No. S59-202213, Japanese Patent Laid-Open Publication No. S63-27516, Japanese Patent Laid-Open Publication No. S51-129449, and Japanese Patent Laid-Open Publication No. S52-56150 may be used.

(Additive)

In the optical film of the present invention, as for additives, a plasticizer, an UV absorber, an antioxidant, a brittleness modifier, and an optical expression agent may be added.

The plasticizer has a function of improving the fluidity or flexibility of the dope composition. As for the plasticizer, phthalic acid ester-based, fatty acid ester-based, trimellitic acid ester-based, phosphoric acid ester-based, polyester-based and epoxy-based plasticizers may be exemplified.

As for the UV absorber, benzotriazole-based, 2-hydroxybenzophenone-based and phenyl salicylate ester-based UV absorbers may be exemplified. For example, triazoles such as 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, and benzophenones such as 2-hydroxy-4-methoxybenzophenone, 2-hydroxy-4-octoxybenzophenone, 2,2'-dihydroxy-4-methoxybenzophenone may be exemplified.

As for the antioxidant, any compound which prevents the oxidation of (meth)acrylic resin having a cyclic structure in its main chain may be suitably added. A vinyl group-containing phenolic antioxidant capable of trapping alkyl radicals generated at the initial stage of the autoxidation of a resin is particularly preferred, and for example, SUMILIZER GM, and SUMILIZER GS manufactured by Sumitomo Chemical Company, Limited may be exemplified. The antioxidant of the above described compound represented by Formula (1) has an action mechanism for trapping or decomposing peroxide radicals generated at the mid-late stages of the autoxidation of the resin. Thus, by adding an antioxidant suitable for each case, an effect may be expected.

In the optical film of the present invention, for example, various antioxidants, brittleness modifiers, and optical expression agents may also be added as additives to improve a thermal decomposable property or heat coloration during molding.

As for the additives described above, only one kind of additive may be used alone, or two more kinds thereof may be used in combination.

The characteristics of the optical film of the present invention will be described below.

(Moisture Permeability of Optical Film in Terms of 40 μm)

In the present specification, "moisture permeability in terms of 40 μm" of optical film refers to a standard value obtained by converting the moisture permeability of a film based on a film thickness of 40 μm, in which the moisture permeability is measured under conditions of temperature 40° C. and 90% RH in accordance with the method defined in JIS Z-0208. In samples differing in film thickness, the values need to be converted based on 40 μm.

Here, the thickness of the optical film of the present invention preferably ranges from 10 μm to 60 μm, more preferably from 10 μm to 50 μm, and further preferably from 20 μm to 50 μm.

Meanwhile, it is assumed that the moisture permeability in terms of 40 μm is converted according to the following mathematical formula.

Mathematical formula: moisture permeability in terms of 40 μm=measured moisture permeability×measured film thickness (μm)/40 (μm)

The moisture permeability in terms of 40 μm of the optical film of the present invention is preferably 70 g/m$^2$/day or less, more preferably 50 g/m$^2$/day or less, and still more preferably 40 g/m$^2$/day or less so that in the liquid crystal display device employing the optical film of the present invention, warpage of a liquid crystal cell or display unevenness in black display may be suppressed after elapse of time in environment of room temperature, high-humidity or high temperature/high humidity.

(Glass Transition Temperature of Optical Film)

The glass transition temperature (Tg) in the present specification is obtained using a dynamic viscoelasticity measuring device as described below.

A film sample (unstretched, 5 mm×30 mm) of the present invention is humidified at 25° C. and 60% RH for two hours or more, and then measured by a dynamic viscoelasticity measuring device (Vibron: DVA-225 (manufactured by ITK Co., Ltd.)) at a chuck-to-chuck distance of 20 mm, a temperature rise rate of 2° C./min, a measurement temperature range from 30° C. to 250° C., and a frequency of 1 Hz. When the storage modulus is taken as a logarithmic axis on the ordinate, and the temperature (° C.) is taken as a linear axis on the abscissa, an abrupt reduction in the storage modulus which is observed in the transition of the storage modulus from a solid region to a glass transition region is drawn as a straight line 1 in the solid region, and drawn as a straight line 2 in the glass transition region. Here, the intersection between the straight line 1 and the straight line 2 is a temperature at which the storage modulus abruptly decreases during the temperature rise and a film starts softening, that is, a temperature at which the transition to the glass transition region starts. Thus, this point is defined as a glass transition temperature (Tg) (dynamic viscoelasticity).

In the present invention, the glass transition temperature (Tg) of the (meth)acrylic resin having a cyclic structure in its main chain is preferably 90° C. or more in view of the production suitability and heat resistance. The glass transition temperature of the (meth)acrylic resin having a cyclic structure in its main chain preferably ranges from 90° C. to 200° C., more preferably from 100° C. to 150° C., and particularly from 110° C. to 150° C.

(Number of Folding-Endurable Times of Optical Film)

In the present specification, the number of folding-endurable times of a film was measured using a folding endurance tester (MIT, BE-201 type manufactured by TESTER SANGYO CO. LTD.) by a sample film (width: 15 mm, length: 80 mm) under a load of 500 g in accordance with JIS P8115 in which the sample was allowed to stand still at 25° C., 65% RH for 1 hour or more. Meanwhile, as in a case of a flexible film, the film was folded in two directions, and how many times the film was folded before being broken was measured. Measurement in each direction was performed three times, and average values in respective directions were obtained. Then, an average value in a direction in which the average value was smaller was set as the number of folding-endurable times.

In the present invention, the number of folding-endurable times of a film is preferably 30 or more in view of brittleness and conveyance suitability of the film. Further, the number is preferably 100 or more, and particularly preferably 200 or more.

(Ratio of Moisture Permeability of Optical Film)

It is desirable that the optical film of the present invention satisfies the following equation (1).

$$P1/P0 \leq 0.95 \qquad \text{Equation (1)}$$

In equation (1), P1 represents a moisture permeability of an optical film in which a compound represented by Formula (1) is added in an amount of 20% by mass, and a rubber elastic body is added in an amount of 15% by mass based on the mass of the (meth)acrylic resin having a cyclic structure in its main chain, and P0 represents a moisture permeability of an optical film composed of only the (meth)acrylic resin having a cyclic structure in its main chain. Meanwhile, the moisture permeability refers to a value in terms of a film thickness of 40 μm when the value is obtained after the elapse of 24 hours at 40° C. and 90% RH by a method of JIS Z-0208.

In the present invention, P1/P0 is preferably 0.95 or less. Further, P1/P0 is preferably 0.90 or less, and particularly preferably 0.85 or less.

(Ratio of Glass Transition Temperature of Optical Film)

The optical film of the present invention preferably satisfies the following equation (2).

$$T1/T0 \geq 0.75 \qquad \text{Equation (2)}$$

In Equation (2), T1 represents a glass transition temperature of an optical film in which a compound represented by Formula (1) is added in an amount of 20% by mass in total, and a rubber elastic body is added in an amount of 15% by mass based on the mass of the (meth)acrylic resin having a cyclic structure in its main chain, and T0 represents a glass transition temperature of an optical film composed of only the (meth)acrylic resin having a cyclic structure in its main chain.

In the present invention, T1/T0 is preferably 0.75 or more in view of excellent dimensional stability of an obtained optical film. Further, T1/T0 is preferably 0.8 or more, and particularly preferably 0.85 or more. Since the optical film is suppressed from shrinking due to its excellent dimensional stability, it is possible to avoid a problem such as a warpage of a polarizing plate when the polarizing plate is processed.

(Ratio of Number of Folding-Endurable Times of Optical Film)

The optical film of the present invention preferably satisfies the following equation (3).

$$Z1/Z0 \geq 1.1 \qquad \text{Equation (3)}$$

In Equation (3), Z1 represents the number of folding-endurable times of an optical film in which a compound represented by Formula (1) is added in an amount of 20% by mass in total, and a rubber elastic body is added in an amount of 15% by mass based on the mass of the (meth) acrylic resin having a cyclic structure in its main chain, and Z0 represents the number of folding-endurable times of an optical film composed of only the (meth)acrylic resin having a cyclic structure in its main chain.

In the present invention, Z1/Z0 is preferably 1.1 or more. Further, Z1/Z0 is preferably 4 or more, and particularly preferably 10 or more.

The optical film of the present invention is excellent in a heat resistance, and may be efficiently manufactured, and thus is useful for various applications. Also, the film is excellent in the heat resistance and has a low haze value, and thus may be suitably used as an optical film such as a polarizing plate protective film or an optically-compensatory film.

As for preferred applications of the optical film of the present invention, a polarizing plate protective film and an optically-compensatory film will be described.

[Polarizing Plate Protective Film]

The polarizing plate protective film of the present invention has at least one layer of the optical film of the present invention. In the configuration, only one layer of the optical film of the present invention may be included, or two or more layers of the optical film of the present invention may be included. A configuration having only one layer is preferred.

The polarizing plate protective film may have a multi-layered configuration including a layer other than the optical film of the present invention. In a multi-layered configuration including two or more layers of the optical film of the present invention, respective optical films may be the same or different. In the polarizing plate protective film, the surface of the optical film of the present invention may be subjected to a surface treatment or provided with a functional layer as described below. The polarizing plate protective film of the present invention may preferably have a configuration including the optical film of the present invention as at least one side outermost layer (a layer having an air interface).

<Manufacturing Method of Optical Film>

Next, a method of manufacturing the optical film of the present invention will be described.

The optical film of this invention is preferably manufactured by a melted film formation method or a solution film formation method.

Hereinafter, the melted film formation method and the solution film formation method will be described below.

(Melted Film Formation Method)

[Film Formation Method by Heat Melting]

The optical film of this invention can be manufactured by a film formation method by heat melting.

The film formation method by melting may obtain a film by heat melting the (meth)acrylic resin composition containing a cyclic structure in its main chain (hereinafter, also called the resin composition of the present invention) to the temperature which shows fluidity to form the melt, and by cooling the melt. Then, the film may be appropriately stretched in both the conveying direction and the width direction or either one direction.

In the present invention, a compound represented by Formula (1) is contained as an additive for improving low moisture permeability. The said compound has high heat resistance so that the melted film formation can be also suitably used as a method of manufacturing the (meth) acrylic resin film of the present invention.

A molding method by heat melting can be, more specifically, classified into a melt extrusion molding method, a press molding method, an inflation method, an injection molding method, a blow molding method, a stretch molding method. Among those, to obtain an optical film consisting of a (meth) acrylic resin having a cyclic structure in its main chain excellent in the mechanical strength and the surface accuracy, a melt extrusion method is excellent.

It is usually desirable to previously knead and pelletize a (meth) acrylic resin having a cyclic structure in its main chain and an additive as a raw material used in melt extrusion.

Pelletizing is carried out by a known method. For example, pelletizing is accomplished by supplying a (meth) acrylic resin having a cyclic structure in its main chain or an additive to an extruder using a feeder, kneading them using 1-axis or 2-axis extruder, extruding into a strand from a die, water-cooling or air-cooling them, and cutting them.

Additives may be mixed prior to feeding to an extruder or each respectively may be supplied to a separate feeder. A small amount of additives such as antioxidants are preferably mixed in advance in order to be uniformly mixed. Further, the additives may be applied on the obtained pellets evenly and added in the extruder at the time of film formation.

Mixing of antioxidants may be conducted in a solid state, and if necessary, antioxidants may be dissolved in a solvent, impregnated in the (meth) acrylic resin having a cyclic structure in its main chain, or sprayed to mix them.

If the feeder portion and the outlet of the die contact with air, it is preferably under atmosphere such as dehumidified air or dehumidified $N_2$ gas.

An extruder is preferably possible to be processed at a low temperature to suppress the shear force of the resin, not to degradate the resin (molecular weight reduction, coloration, gel formation, etc.), and to pelletize the resin.

Film formation is conducted using the obtained pellets as described above. Film formation is also possible to feed the raw material powder as it is to the extruder by a feeder without pelletization and to form a film as it is.

As the process of extruding the melt from a die, when extruding the dried polymer using a uniaxial or biaxial type extruder under dehumidified hot air or a vacuum or under reduced pressure, it is preferred to form a film from the die mold and solidify the film on the cooling roll after the removal of foreign substances by filtration through a filter at a melting temperature of about 200 to 300° C.

When introducing the pellets to extruder, it is preferred to avoid oxidation degradation by placing them under a vacuum or under reduced pressure, but in an inert gas atmosphere.

The extrusion flow rate is preferably carried out by stably introducing the gear pump.

The melt extruded from the die is preferably formed to a film by pressing it between the cooling roll and the touch roll in the step of molding.

When peeling the film from the cooling roll, it is preferred to prevent the deformation of the film.

In the present invention, the film may be appropriately stretched in both the conveying direction and the width direction or either one direction. The stretching method can preferably use known roll stretching device, a tenter or the like.

In addition, the stretching method may be carried out under the known thermo-setting conditions, cooling or relaxation treatment, and it may be properly adjusted so as to have the properties required of the optical film.

(Solution Film Formation Method)

The optical film of the present invention is manufactured by a solution film formation method including at least a step of dissolving a (meth)acrylic resin having a cyclic structure in its main chain, a compound represented by Formula (1) and a rubber elastic body in a solvent to prepare a (meth) acrylic resin composition having a cyclic structure in its main chain (dope composition), a step of casting the dope composition on a support to form a casting film, a step of drying the casting film, and a step of peeling the dried casting film from the support to obtain a film.

As necessary, after the peeling of the casting film, a step of further drying the peeled-off film to remove residual solvent (volatile content) may be further performed.

As necessary, after the peeling of the casting film, a step of stretching the peeled film in at least uniaxial direction or in biaxial directions if necessary may be performed.

Hereinafter, respective steps will be described.

(1) Dissolution Step

In a dissolution step, the dope composition is prepared. Preferably, in the dissolution step in the present invention, a polymer and additives are dissolved through stirring in an organic solvent to be mainly a good solvent for the polymer, within a melting pot, to form a dope, or a polymer solution is mixed with an additive solution to form a dope composition.

The dope composition is preferably adjusted at a temperature equal to or greater than 0° C. (equal to or greater than a room temperature). The preparation of the dope composition of the present invention may be performed using a preparation method and device of a dope in a conventional solvent casting method.

In the dissolution of the polymer, various dissolution methods such as a method of carrying out the dissolution at a normal pressure, a method of carrying out the dissolution at a temperature not higher than a boiling point of the main solvent, a method of carrying out the dissolution at a temperature not lower than a boiling point of the main solvent under pressure, a method of carrying out the dissolution by a cooling dissolution method as disclosed in, for example, Japanese Patent Laid-Open Publication No. H9-95544, Japanese Patent Laid-Open Publication No. H9-95557 or Japanese Patent Laid-Open Publication No. H9-95538, and a method of carrying out the dissolution at a high pressure as disclosed in Japanese Patent Laid-Open Publication No. H11-21379 may be used. In a viewpoint of the dissolution efficiency, a method of performing the dissolution at a temperature not lower than a boiling point of the main solvent under pressure is particularly preferred. In this case, a (meth)acrylic resin having a cyclic structure in its main chain, a solvent (A) and a solvent (B) are put into a pressurized container and tightly sealed, and are stirred with heating at a temperature at which the solvent does not boil under pressure, which is also equal to or higher than the boiling point of the solvent at a room temperature of the solvent.

The temperature in a case of the heating is generally 40° C. or more, and preferably ranges from 60° C. to 200° C., and more preferably from 80° C. to 110° C.

The concentration of the (meth)acrylic resin having a cyclic structure in its main chain in the dope composition preferably ranges from 10% to 40% by mass. During or after dissolution, the dope composition may be added with additives, followed by dissolution and dispersion. The resultant product may be filtered through a filter medium, degassed and fed to a following step by a feed pump.

(2) Casting Step

In the casting step, the above described dope composition is casted on a metal support to form a casting film. Preferably, in the casting step, a dope is fed to a pressure die through the feed pump (e.g., a pressure-type metering gear pump) so that the dope composition is casted from a pressure die slit at a casting position on a metal support such as an endless metal belt which infinitely carries out transfer (e.g., a stainless steel belt), or a rotating metal drum. The surface of the metal support is made into a mirror surface. Two or more pressure dies may be provided on the metal support to increase the film forming rate so that the dope composition may be divided to be multi-layered. Otherwise, preferably, a film having a multi-layered structure may be obtained by a co-casting method for simultaneously casting a plurality of dope compositions.

(3) Solvent Evaporation Step

Preferably, the solvent evaporation step may be interposed between the casting step and the peeling step. In the solvent evaporation step, the casting film (also called a web: which still contains a large amount of solvent before made into a final product of a polymer film) is heated on the metal support and the solvent is evaporated until the web becomes peelable from the metal support.

In order to evaporate the solvent, a method of blowing air from the web side and/or a method of transferring heat from the rear surface of the metal support by using a liquid, or a method of transferring heat from the front and back sides by using a radiant heat may be exemplified. The rear-surface heat transferring method using the liquid is excellent in a drying efficiency, and thus is preferred. Also, these methods may be combined with each other. In the rear-surface heat transferring method using the liquid, preferably, the heating is performed at a temperature not higher than a boiling point of a main solvent of an organic solvent used for the dope composition or an organic solvent having the lowest boiling point.

(4) Peeling Step

In the peeling step, the above described casting film is dried and peeled from the above described support to obtain a film. In the peeling step, preferably, the web of which the solvent is evaporated on the metal support is peeled at a peeling position. The peeled web is transferred to a following step. Meanwhile, at the point of time of peeling, when the amount of a residual solvent in the web (the following equation) is too sufficiently large, the peeling is difficult. On the contrary, when the drying on the metal support is extremely performed, in the middle of peeling, a part of the web may be peeled.

(5) Drying or Heat-Treatment Step, Stretching Step

After the above described peeling step, the web is preferably dried and stretched in the width direction using a drying device and/or a tenter device. In the drying device, the web is alternately passed through a plurality of rolls arranged in the drying device to be conveyed. The tenter device is configured to convey the web while clipping both ends of the web by clips.

The film may be stretched in the conveying direction of the roller in which the rotation speed of the roller is increased as compared to that of the upstream side rollers so that the optical film is given a draw tension in the conveying direction to be stretched.

The stretching may be performed either a MD direction or a TD direction, and also biaxial stretching may be performed in both directions. The stretching in each direction of the MD and the TD may be performed in one stage or multiple stages. In the biaxial stretching, the stretching may be performed in the order of MD and TD.

[Optically-Compensatory Film]

The optical film of the present invention may be used for various applications other than for the above described polarizing plate protective film. For example, it may be preferably used as an optically-compensatory film for a liquid crystal display device. Meanwhile, the optically-compensatory film refers to an optical material which is generally used for a liquid crystal display device to compensate a phase difference, and is synonymous with, for example, a phase difference plate, and an optically-compensatory sheet. The optically-compensatory film has a birefringence and is used to remove coloration of a display screen of the liquid crystal display device, or to improve the characteristic of a viewing angle.

The optical film of the present invention itself may be used as an optically-compensatory film. Otherwise, the optical film may be used as a support of an optically-compensatory film, and an optically anisotropic layer may be formed on the support. The optically anisotropic layer is not restricted by an optical performance or a driving method of a liquid crystal cell of a liquid crystal display device in which the optical film of the present invention is used. Any optically anisotropic layer required as the optically-compensatory film may be used in combination. As for the optically anisotropic layer used in combination, a composition containing a liquid crystalline compound may be formed, or a thermoplastic film having birefringence may be formed.

[Configuration to be Added to Film]

The optical film of the present invention may have an additional configuration depending on its use. As for such a configuration, a surface treatment performed on a film surface or a functional layer formed on a film surface may be exemplified. Hereinafter, the surface treatment and the functional layer will be described.

(Surface Treatment)

The optical film of the present invention may be subjected to a surface treatment in some cases to improve adhesion between the film and another layer (e.g., a polarizer, an undercoat layer and a back layer). For example, a glow discharge treatment, a UV irradiation treatment, a corona treatment, a flame treatment and an acid or alkali treatment may be used. In the glow discharge treatment mentioned herein, a low temperature plasma treatment under a low pressure gas of $10^{-3}$ Torr to 20 Torr or a plasma treatment under atmospheric pressure may be performed. A plasma-exited gas refers to a gas excited by plasma under the above described condition, and examples thereof may include argon, helium, neon, krypton, xenon, nitrogen, carbon dioxide, fluorocarbons such as tetrafluoromethane and a mixture thereof. These are described in detail in p. 30 to 32 of Journal of Technical Disclosure (Kogi No. 2001-1745, published on Mar. 15, 2001, Japan Institute of Invention and Innovation), and may be preferably used in the present invention.

(Functional Layer)

In the optical film of the present invention, a functional layer with a film thickness ranging from 0.1 μm to 20 μm may be laminated on at least one side surface of the above described film. The kind of the functional layer is not particularly limited, but examples thereof may include a hard coat layer, an anti-reflective layer (a layer with a controlled refractive index such as a low refractive index layer, a middle refractive index layer, a high refractive index layer), an anti-glare layer, an antistatic layer, a UV absorbing layer, and a moisture permeability reducing layer.

The functional layer may be a single layer, and a plurality of functional layers may be provided. A method of laminating the functional layer is not particularly limited, but preferably, the functional layer may be formed through co-casting with a resin composition for forming the optical film of the present invention, and may be formed by being coated on the optical film of the present invention.

When the functional layer is formed through coating and drying, as for a binder, a monomer having an ethylenically unsaturated group may be preferably used. The monomer may be a multifunctional or monofunctional. Particularly, it is preferred to use a polymerizable polyfunctional monomer, it is more preferred to use a photopolymerizable polyfunctional monomer, and it is particularly preferred to use a coating liquid containing a monomer having two or more (meth)acryloyl groups.

Specific examples of the monomer having two or more (meth)acryloyl groups may include: (meth)acrylic acid diesters of alkylene glycols such as neopentylglycolacrylate, 1,6-hexanediol(meth)acrylate, or propyleneglycoldi(meth)acrylate; (meth)acrylic acid diesters of polyoxyalkylene glycols such as triethyleneglycoldi(meth)acrylate, dipropyleneglycoldi(meth)acrylate, polyethyleneglycoldi(meth)acrylate, or polypropyleneglycoldi(meth)acrylate; (meth)acrylic acid diesters of polyhydric alcohols such as pentaerythritol di(meth)acrylate; and (meth)acrylic acid diesters of ethylene oxides or propyleneoxide adducts such as 2,2-bis4-(acryloxy-diethoxy)phenyl propane, or 2-2-bis4-(acryloxy-polypropoxy)phenyl propane.

Further, epoxy(meth)acrylates, urethane(meth)acrylates, and polyester(meth)acrylates are also preferably used as photopolymerizable polyfunctional monomers.

Among them, esters of polyhydric alcohols and (meth)acrylic acids are preferred. The polyhydric alcohol refers to a divalent or higher polyvalent alcohol.

More preferably, a polyfunctional monomer having three or more (meth)acryloyl groups in one molecule is preferred. Examples thereof may include pentaerythritoltetra(meth)acrylate, pentaerythritoltri(meth)acrylate, trimethylolpropanetri(meth)acrylate, ethyleneoxide-modified trimethylolpropanetri(meth)acrylate, propyleneoxide-modified trimethylolpropanetri(meth)acrylate, ethyleneoxide-modified phosphoric acid tri(meth)acrylate, trimethylolethanetri(meth)acrylate, ditrimethylolpropanetetra(meth)acrylate, dipentaerythritoltetra(meth)acrylate, dipentaerythritolpenta(meth)acrylate, dipentaerythritolhexa(meth)acrylate, 1,2,3- cyclohexanetetramethacrylate, polyurethanepolyacrylate, polyesterpolyacrylate, and caprolactone-modified tris(acryloxyethyl)isocyanurate.

Also, a resin having three or more (meth)acryloyl groups such as, for example, a relative low molecular weight polyester resin, a polyether resin, an acrylic resin, an epoxy resin, an urethane resin, an alkyd resin, a spiroacetal resin, a polybutadiene resin, and a polythiolpolyene resin, and an oligomer or prepolymer of a polyfunctional compound such as polyhydric alcohol may be exemplified.

As for another polyfunctional monomer, for example, a dendrimer disclosed in Japanese Patent Laid-Open Publication Nos. 2005-76005 and 2005-36105 may be used.

Also, as for the polyfunctional monomer, amides of polyhydric alcohols and isocyanates containing a plurality of (meth)acryloyl groups may be preferably used.

As for the polyhydric alcohol, an aliphatic alcohol is preferred, and particularly, an alcohol having a cyclic aliphatic hydrocarbon group is more preferred. As for the aliphatic group of a monocyclic alicyclic alcohol, a cycloalkyl group having 3 to 8 carbon atoms is preferred, and a cyclopentyl group, a cyclohexyl group, a cyclobutyl group, and an cyclooctyl group may be exemplified.

As for the aliphatic group of a polycyclic alicyclic alcohol, a group having a bicyclo, tricyclo or tetracyclo structure having 5 or more carbon atoms may be exemplified, and a cycloalkyl group having 6 to 20 carbon atoms is preferred. For example, an adamantly group, a norbornyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 may be exemplified. Meanwhile, a part of carbon atoms in the cycloalkyl group may be substituted by heteroatoms such as oxygen atoms.

Among them, as for a polycyclic alcohol, polyhydric alcohols having an adamantly group, a norbornyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 are particularly preferred in view of reducing the moisture permeability.

Two or more kinds of polymerizable polyfunctional monomers may be used in combination. The polymerization of these monomers having ethylenically unsaturated groups may be performed by irradiation of ionizing radiation or heating in the presence of a photo-radical initiator or a thermal-radical initiator.

In the polymerization reaction of the photopolymerizable polyfunctional monomer, a photo-polymerization initiator is preferably used. As for the photo-polymerization initiator, a photo-radical polymerization initiator and a photocationic polymerization initiator are preferred, and a photo-radical polymerization initiator is particularly preferred.

It is also preferable to use the above described polymerizable polyfunctional monomer and a monofunctional monomer in combination.

As for the monofunctional monomer, a monomer having one (meth)acryloyl group is preferred, and the monomer having one (meth)acryloyl group is generally obtained from a monohydric alcohol and (meth)acrylic acid.

The monohydric alcohol described above may be an aromatic alcohol or an aliphatic alcohol.

Examples of the monohydric alcohol may include methyl alcohol, n-propylalcohol, iso-propylalcohol, n-butylalcohol, tert-butylalcohol, n-amylalcohol, diacetonealcohol, 1-methoxy-2-propanol, furfurylalcohol, 2-octanol, 2-ethylhexanol, nonanol, n-decanol, undecanol, n-dodecanol, trimethylnonylalcohol, benzylalcohol, phenethylalcohol, ethyleneglycolmonoisoamylether, ethyleneglycolmonophenyl ether, ethyleneglycolmonobenzylether, and ethyleneglycolmonohexylether.

The aliphatic portion of the aliphatic alcohol may be cyclic aliphatic. The cyclic aliphatic group may be monocyclic or polycyclic, and a polycyclic group may be a bridged-type group. As for a monocyclic group, a cycloalkyl group having 3 to 8 carbon atoms is preferred, and a cyclopentyl group, a cyclohexyl group, a cyclobutyl group, and a cyclooctyl group are exemplified. As for a polycyclic group, a group having a bicyclo, tricyclo or tetracyclo structure having 5 or more carbon atoms may be exemplified, and a cycloalkyl group having 6 to 20 carbon atoms is preferred. For example, an adamantyl group, a norbomyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 may be exemplified. Meanwhile, a part of carbon atoms in the cycloalkyl group may be substituted by heteroatoms such as oxygen atoms.

The monohydric alcohol may be an aromatic alcohol or an aliphatic alcohol, and preferably has 6 or more carbon atoms.

As for the (meth)acrylic acid, an acrylic acid or a methacrylic acid is preferred.

Various additives may be added to a material for the functional layer in order to manufacture an anti-reflective layer (a layer with a controlled refractive index such as a low refractive index layer, a middle refractive index layer, a high refractive index layer), an anti-glare layer, an antistatic layer, a UV absorbing layer, or a moisture permeability reducing layer, as for the functional layer.

The thickness of the functional layer more preferably ranges from 0.01 μm to 100 μm, and particularly preferably from 0.02 μm to 50 μm. More particularly, it is preferable that a functional layer for reducing the moisture permeability has a thickness ranging from 0.1 μm to 20 μm.

In a case of the functional layer for reducing the moisture permeability, a ratio of the moisture permeability (C) of an optical film having the functional layer laminated therein, to the moisture permeability (D) of an optical film with no laminated functional layer is preferably 0.9 or less, and more preferably 0.85 or less, and further more preferably 0.8 or less.

<Polarizing Plate>

Hereinafter, a polarizing plate of the present invention will be described. The polarizing plate of the present invention is characterized in that it has a polarizing plate protective film of the present invention. The configuration of the polarizing plate protective film of the present invention may refer to the descriptions in the column of [polarizing plate protective film] above.

The polarizing plate may be manufactured by a general manufacturing method. There is a method in which the polarizing plate protective film of the present invention is subjected to an alkali treatment, and is bonded to both surfaces of a polarizer through a completely saponified polyvinylalcohol aqueous solution. The polarizer is manufactured by dipping a polyvinylalcohol film in an iodine solution and stretching the film. Instead of the alkali treatment, an easy-to-bond processing as disclosed in Japanese Patent Laid-Open Publication No. H6-94915, and Japanese Patent Laid-Open Publication No. H6-118232 may be performed. also, above described surface treatment may be carried out.

As for an adhesive used for bonding the treated surface of the polarizing plate protective film to the polarizer, a polyvinylalcohol-based adhesive such as polyvinylalcohol or polyvinylbutyral, and a vinyl-based latex such as butyl acrylate may be exemplified.

The polarizing plate protective film and the polarizer may be bonded to each other through other adhesives or sticking agents, or may be directly laminated without any adhesive or sticking agent.

<Liquid Crystal Display Device>

The liquid crystal display device of the present invention is characterized in that it has the polarizing plate of the present invention, and preferably includes a liquid crystal cell, and the polarizing plate of the present invention which is disposed at least one side of the liquid crystal cell. More preferably, the polarizing plate protective film of the present invention, which is included in the above described polarizing plate, is disposed as the outermost layer.

[Example]

The present invention will be described in detail with reference to Examples. For example, materials, reagents, amounts and ratios of substances, and operations illustrated in the following examples below may be appropriately changed without departing from the spirit of the present invention. Accordingly, the present invention is not limited to the following examples.

<Preparation of Material>

(Synthesis of (Meth)acrylic Resin Having a Cyclic Structure in its Main Chain)

[Preparation of Acrylic Resin A]

8000 g of methyl methacrylate(MMA), 2000 g of 2-(hydroxymethyl)methyl acrylate(MHMA) and 10000 g of toluene as a polymerization solvent were charged to a 30 L reaction kiln provided with a stirrer, a temperature sensor, a cooling tube and a nitrogen introduction tube, vented with nitrogen and raised to 107° C. At the time of reflux started in accordance with the raised temperature, at the same time of adding 10 g of t-amylperoxyisononanoate as a polymerization initiator, a solution consisting of 20 g of t-amylperoxyisononanoate and 100 g of toluene was added dropwise for 2 hours. The solution polymerization was proceeded under the reflux of about 105 to 110° C., and matured again for 4 hours. The polymerization reaction rate was 95%, and the content (a mass ratio) of MHMA in the resulting polymer was 20%.

Subsequently, 10 g of stearyl phosphate/distearyl phosphate mixture (Phoslex A-18, manufactured by Sakai Chemical Industry Co., Ltd.) as a cyclization catalyst was added to the obtained polymerization solution for 5.5 hours under a reflux of approximately 80 to 100° C., and thus the cyclization condensation reaction was proceeded.

Subsequently, the resulting polymerization solution was introduced in the vent-type screw biaxial extruder (ϕ=29.75 mm, L/D=30) having one rear vent and four fore vents at a barrel temperature of 260° C., rotation speed of 100 rpm, reduced pressure of 13 to 400 hPa (10 to 300 mmHg), introduced at a processing rate of 2.0 kg/hr in terms of the amount of the resin, a cyclization condensation reaction was conducted within the extruder and volatilized. Next, after the completion of volatilization, the heat-molten resin left in the extruder was discharged from the front end of the extruder and pelletized by a pelletizer to give (meth)acryl resin A. An acryl resin A has a lactone ring structure represented by Formula (101). The weight average molecular weight of the resin was 110000 and its glass transition temperature was 125° C.

[Preparation of (Meth)acryl Resin B]

An imide resin was prepared by using 100 parts by mass of methyl methacrylate-styrene copolymer (MS) resin (a composition of 80 mole %: 20 mole %) and 20 parts by mass of monomethylamine (manufactured by Mitsubishi Gas Chemical Company, Inc., Ltd.) as an imidization agent.

The extruder used was an engagement type rotary biaxial extruder in the same direction (L/D=90, a diameter of 40 mm). An inert gas of nitrogen was flown into the extruder at a flow rate of 200 ml/min from a hopper. The temperature in the reaction zone (between from the primary amine additives hole to the vent hole) of the extruder was set to 270° C. and the screw rotation speed was set to 200 rpm. The raw material resin dried at 110° C. for 9 hours was supplied in 20 kg/hr from the hopper, and after the resin was melted and filled by kneading block, 20 parts by mass of monomethylamine (4 kg/hr) was injected with respect to the raw material resin from the nozzle. The reverse flights were put in the end (just before the vent hole) of the reaction zone to fill the resin. By-products and an excess of monomethylamine after the reaction were removed under reduced pressure by setting the pressure of the vent hole −0.092 MPa. The resin came out as strands from a die installed at the outlet of the extruder was cooled in a water bath and then pelletized by a pelletizer to obtain a (meth) acryl resin B. The resin has a glutaric acid ring structure represented by Formula (102). The weight average molecular weight of the resin was 108000 and its glass transition temperature was 124° C.

[Preparation of (Meth)acryl Resin C]

Pellets of the (meth)acryl resin C having a glutarimide ring structure represented by Formula (103) were obtained using the method disclosed in Japanese Patent Laid-Open Publication No. 2002-338624. The weight average molecular weight of the resin was 107,000 and its glass transition temperature was 123° C.

[Preparation of (Meth)acryl Resin D]

Pellets of the (meth)acryl resin D having a succinic anhydride ring structure represented by Formula (104) were obtained using the method disclosed in Japanese Patent Laid-Open Publication No. 2008-216586. The weight average molecular weight of the resin was 105000 and its glass transition temperature was 121° C.

(Synthesis of Compound Represented by Formula (1))

Synthesis Example 1: Synthesis of A-30

83 g of phenol and 5 g of n-octyl mercaptan were charged to a 1 L three-necked flask provided with a thermometer, stirring blades, a dropping funnel and a reflux cooling tube, and the inside of the system was purged with nitrogen. Then, 25.2 g of 3,3,5-trimethylcyclohexanone was charged thereto, and the temperature was maintained at 45° C. while a hydrogen chloride gas was blown thereto, followed by a reaction for 4 hours. After the completion of the reaction, the resultant product was neutralized by adding 12% by mass of aqueous sodium hydroxide, and heated up to 80° C. first, and then cooled to a room temperature. Then, the precipitate crystals were separated by filtration. The obtained crude crystals were dispersed and dissolved in a large amount of toluene, dehydrated through azeotropic dehydration, and stirred by for 30 min under reflux with addition of 5 g of activated clay. The activated clay was removed by thermal filtration, and the obtained filtrate was recrystallized by adding 28 g of water so that target compound A-30 corresponding to Formula (1) of the present invention was obtained (43 g, white crystals).

Synthesis Example 2: Synthesis of A-13

Target compound A-13 (30 g, white crystals) corresponding to Formula (1) of the present invention was obtained in the same manner as in Synthesis Example 1 except that phenol was changed to 2-cyclohexylphenol, and 3,3,5-trimethylcyclohexanone was changed to cyclohexanone.

Synthesis Example 3: Synthesis of A-23

Target compound A-23 (30 g, white crystals) corresponding to Formula (1) of the present invention was obtained in the same manner as in Synthesis Example 1 except that 3,3,5-trimethylcyclohexanone was changed to tricyclo[5.2.1.0(2,6)]decane-8-one.

Synthesis Example 4: Synthesis of B-1

Target compound B-1 (30 g, white crystals) represented by Formula (B-1) below was obtained in the same manner as in Synthesis Example 1 except that 3,3,5-trimethylcyclohexanone was changed to 2-octanone.

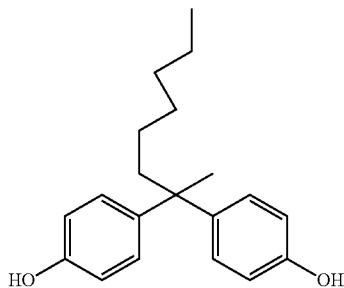

Formula (B-1)

[Manufacture of Film 1]

100 parts by mass of the (meth)acrylic resin A and the additives A-30; 5 parts by mass of pellets of the mixture (Tg of 117° C.) and 10 parts by mass of rubber elastic body C-1 were supplied to a twin-screw extruder, melted and extruded into a sheet at about 280° C. to manufacture an elongated optical film No. 1 with a thickness of 40 µm, and it was used as a sample of Example 1. Meanwhile, as for rubber elastic body C-1, Kane Ace M-210 (manufactured by Kaneka Corporation) was used.

<Manufacture of Optical Films Nos. 2 to 17>

Optical films Nos. 2 to 17 were manufactured in the same manner as in Optical film No. 1 except that a (meth)acrylic resin having a cyclic structure in its main chain, an additive and a rubber elastic body, and added amounts thereof were changed as noted in Table 1.

The moisture permeability, the glass transition temperature, and the number of folding-endurable times of each obtained optical film were measured by the following method, and the obtained results were noted in Table 1 below. Further, as for rubber elastic body C-2 Optical film No. 10, Kane Ace M-711 (manufactured by Kaneka Corporation) was used.

[Evaluation of Optical Film]

(Moisture Permeability)

As described above, in accordance with a method defined in JIS Z-0208, the moisture permeability of a film, which was measured under conditions of 40° C. and 90% RH, was calculated (moisture permeability in terms of 40 µm).

(Glass Transition Temperature)

A film sample (unstretched, 5 mm×30 mm) was humidified at 25° C. and 60% RH for two hours or more, and then measured by a dynamic viscoelasticity measuring device (Vibron: DVA-225 (manufactured by ITK Co., Ltd.)) at a chuck-to-chuck distance of 20 mm, a temperature rise rate 2° C./min, a measurement temperature range from 30° C. to 250° C., and a frequency of 1 Hz. Then, an abrupt reduction in the storage modulus was drawn as a straight line 1 in the solid region, and drawn as a straight line 2 in the glass transition region. The intersection between the straight line 1 and the straight 2 was plotted to obtain a glass transition temperature (Tg).

(Number of Folding-Endurable Times)

The number of folding-endurable times was measured using a folding endurance tester (MIT, BE-201 type manufactured by TESTER SANGYO CO., LTD.) by a sample film (width: 15 mm, length: 80 mm, thickness: 40 µm) under a load of 500 g in accordance with JIS P8115 in which the sample was allowed to stand still at 25° C., 65% RH for 1 hour or more.

(Ratio P1/P0 of Moisture Permeability of Optical Film)

The moisture permeability (P1) of an optical film in which a compound represented by Formula (1) or (2) was added in an amount of 20% by mass, and a rubber elastic body was added in an amount of 15% by mass based on the mass of a (meth)acrylic resin, and the moisture permeability (P0) of an optical film composed of only the (meth)acrylic resin were obtained, respectively, and a ratio of P1 to P0 was calculated.

(Ratio T1/T0 of Glass Transition Temperature of Optical Film)

A glass transition temperature (T1) of an optical film in which a compound represented by Formula (1) or (2) was added in an amount of 20% by mass, and a rubber elastic body was added in an amount of 15% by mass based on the mass of a (meth)acrylic resin, and a glass transition temperature (T0) of an optical film composed of only the (meth)acrylic resin were obtained, respectively, and a ratio of T1 to T0 was calculated.

(Ratio Z1/Z0 of Number of Folding-endurable Times of Optical Film)

A number of folding-endurable times (Z1) of an optical film in which a compound represented by Formula (1) or (2) was added in an amount of 20% by mass, and a rubber elastic body was added in an amount of 15% by mass based on the mass of a (meth)acrylic resin, and a number of folding-endurable times (Z0) of an optical film composed of only the (meth)acrylic resin were obtained, respectively, and a ratio of Z1 to Z0 was calculated.

TABLE 1

| | Optical Film No. | Resin | Mw | Compound of Formula (1) | | Rubber Elastic Body | | Moisture Permeability @ in terms of 40 µm g/m²/day | P1/P0 | Tg °C. | T1/T0 | Number of Folding-endurable Times @40 µm | Z1/Z0 |
| | | | | Kind | Added Amount | Kind | Added Amount | | | | | | |
|---|---|---|---|---|---|---|---|---|---|---|---|---|---|
| Example 1 | 1 | resin A | 110,000 | A-30 | 5 | C-1 | 10 | 72 | 0.94 | 117 | 0.94 | 420 | 2.8 |
| Example 2 | 2 | resin A | 110,000 | A-30 | 10 | C-1 | 10 | 67 | 0.87 | 114 | 0.91 | 405 | 2.7 |

TABLE 1-continued

| Optical Film No. | Resin | Mw | Compound of Formula (1) Kind | Compound of Formula (1) Added Amount | Rubber Elastic Body Kind | Rubber Elastic Body Added Amount | Moisture Permeability @ in terms of 40 μm g/m²/day | P1/P0 | Tg ° C. | T1/T0 | Number of Folding-endurable Times @40 μm | Z1/Z0 |
|---|---|---|---|---|---|---|---|---|---|---|---|---|
| Example 3 | 3 | resin A | 110,000 | A-30 | 20 | C-1 | 10 | 56 | 0.73 | 109 | 0.87 | 380 | 2.5 |
| Comparative Example 1 | 4 | resin A | 110,000 | — | 0 | — | 0 | 77 | 1.00 | 125 | 1.0 | 150 | 1.0 |
| Comparative Example 2 | 5 | resin A | 110,000 | — | 0 | C-2 | 10 | 85 | 1.10 | 125 | 1.00 | 450 | 3.0 |
| Comparative Example 3 | 6 | resin A | 110,000 | A-30 | 10 | — | 0 | 59 | 0.77 | 114 | 0.91 | 120 | 0.8 |
| Comparative Example 4 | 7 | resin A | 110,000 | B-1 | 10 | C-1 | 10 | 63 | 0.82 | 91 | 0.73 | 350 | 2.3 |
| Example 4 | 8 | resin A | 110,000 | A-13 | 10 | C-1 | 10 | 66 | 0.86 | 115 | 0.92 | 390 | 2.6 |
| Example 5 | 9 | resin A | 110,000 | A-23 | 10 | C-1 | 10 | 68 | 0.88 | 113 | 0.90 | 415 | 2.8 |
| Example 6 | 10 | resin A | 110,000 | A-30 | 10 | C-2 | 10 | 67 | 0.87 | 114 | 0.91 | 579 | 3.9 |
| Example 11 | 12 | resin B | 108,000 | A-30 | 10 | C-1 | 10 | 69 | 0.87 | 112 | 0.90 | 386 | 2.7 |
| Comparative Example 21 | 13 | resin B | 108,000 | — | 0 | — | 0 | 79 | 1.00 | 124 | 1.0 | 143 | 1.0 |
| Example 21 | 14 | resin C | 107,000 | A-30 | 10 | C-1 | 10 | 69 | 0.87 | 112 | 0.91 | 338 | 2.7 |
| Comparative Example 21 | 14 | resin C | 107,000 | — | 0 | — | 0 | 79 | 1.00 | 123 | 1.0 | 125 | 1.0 |
| Example 31 | 16 | resin D | 105,000 | A-30 | 10 | C-1 | 10 | 70 | 0.88 | 111 | 0.92 | 290 | 2.8 |
| Comparative Example 31 | 17 | resin D | 105,000 | — | 0 | — | 0 | 80 | 1.00 | 121 | 1.0 | 105 | 1.0 |

In Table 1 above, the numerical values noted in the column "added amount" refer to parts by mass of a compound represented by Formula (1) and parts by mass of a rubber elastic body based on 100 parts by mass of a resin.

From Table 1 above, it was found that in the optical film in each of Examples, the moisture permeability was low, the reduction of a glass transition temperature was small, and the brittleness was excellent.

In contrast, in Comparative Examples 1, 11, 21, 31 which includes a (meth)acrylic resin having a cyclic structure in its main chain and which does not include a compound represented by Formula (1) and a rubber elastic body, the moisture permeability was higher, and the brittleness was poor as compared to in Examples. In the optical film of Comparative Example 2 which includes only a (meth)acrylic resin having a cyclic structure in its main chain and a rubber elastic body, the moisture permeability was higher as compared to in Examples, and in the optical film of Comparative Example 3 which includes only a (meth)acrylic resin having a cyclic structure in its main chain and a compound represented by Formula (1), the brittleness was poor as compared to in Examples. Further, in the optical film of Comparative Example 4 which includes a compound (B–1) other than the compound represented by Formula (1), Tg was lower and the heat resistance was inferior as compared to in Examples, and the optical film was inferior in terms of a dimensional stability and thus shrank from its original dimension.

<Manufacture of Polarizing Plate>
<Manufacture of Polarizing Plate Protective Film>

[Preparation of Coating Composition HCL-1 for Forming Hard Coat Layer]

8 parts by mass of Pentaerythritol triacrylate, 0.5 parts by mass of Irgacure 127 (manufactured by BASF), and 4 parts by mass of a bifunctional acrylic compound represented by Formula C-3 below were mixed with each other to prepare a coating material (HCL-1) for forming a hard coat layer.

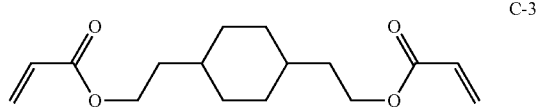 [SMILES: C=CC(=O)OCCC1CCC(CCOC(=O)C=C)CC1]

C-3

[Manufacture of Hard Coat Layer]

On each of optical films Nos. 1 to 17 manufactured as described above, the coating liquid (HCL-1) for forming a hard coat layer was coated by a die coating method, and dried at 80° C. for 5 min. Then, the coated layer was cured under a nitrogen purge by irradiation with UV rays in a dose of 300 mJ/cm² using an "air-cooled metal halide lamp" (240 W/cm, manufactured by EYE GRAPHICS Co., Ltd.) to form a hard coat layer having a dried film thickness of 5 μm.

In this manner, polarizing plate protective films Nos. 1 to 17 were manufactured in which each of the films as manufactured above has a hard coat layer thereon.

<Manufacture of Polarizing Plate>
[Manufacture of Polarizer]

By adsorbing iodine on a stretched polyvinyl alcohol film, a polarizer with a film thickness of 20 μm was manufactured. In the manufacture of the polarizer, for example, the method described in Example 1 of Japanese Patent Application Laid-Open No. 2001-141926 may be used, and a PVA layer formed on an amorphous PET substrate may be stretched as the polarizing film 1 described in Japanese Patent Laid-Open Publication No. 2013-008019.

[Manufacture of Polarizing Plate used for Liquid Crystal Display Device]
(Manufacture of Polarizing Plate using Bonding Method A)
[Adhesive for Polarizing Plate]

100 parts by mass of 2-hydroxyethyl acrylate, 10 parts by mass of tolylene diisocyanate and 3 parts by mass of photo-polymerization initiator (Irgacure 907, manufactured by BASF) were blended with each other to prepare an adhesive for a polarizing plate.

Polarizing plate protective films No. 1 and optical film No. 1 were prepared, and the adhesive for a polarizing plate was applied onto the two films to a thickness of 5 μm using a micro gravure coater (gravure roll: #300, rotational speed: 140%/line speed) so that the optical films are coated with the adhesive. Then, the two adhesive-coated films were bonded to both surfaces of the polarizer using a rolling device (a mill) through a roll-to-roll method so that the polarizer with a film thickness of 20 μm was sandwiched between the two films. UV rays were irradiated at the sides of the bonded optical films (both sides) so that polarizing plate No. 1 using bonding method A was manufactured. Meanwhile, the line speed was 20 m/min, and the accumulated amount of UV light was 300 mJ/cm². Here, the transmission axis of the polarizer and the conveying direction of a film were arranged to be orthogonal. Similarly, polarizing plates Nos. 2 to 17 using bonding method A were manufactured in the same manner as in the manufacture of polarizing plate No. 1 using bonding method A except that instead of polarizing plate protective film No. 1 and optical film No. 1, polarizing plate protective films Nos. 2 to 9 and optical films Nos. 2 to 9 were used.

(Manufacture of Polarizing Plate using Bonding Method B)

An optical film in each of Examples, and FujiTac TD60UL (manufactured by Fujifilm Corporation) were dipped for 1 minute in 4.5 mol/L of aqueous sodium hydroxide (saponified solution) maintained at a temperature of 37° C. Each film was washed, and then dipped for 30 seconds in 0.05 mol/L of aqueous sulfuric acid solution, and was passed through a washing bath again. Then, draining by air knife was repeated three times to remove the water, and the resultant product stayed in a drying zone of 70° C. for 15 seconds and dried to manufacture a saponified film.

The polarizer with a thickness of 20 μm manufactured by the method described above and a 3% aqueous solution of PVA (manufactured by Kuraray Co., Ltd., PVA-117H) as an adhesive were used, and the polarizer was interposed between a saponified film of one film selected from the group consisting of saponified optical films in each of Examples and a saponified film of Fujitac TD60UL. The two films were bonded in a roll-to-roll method in such a manner that a polarization axis and a longitudinal direction of a film are orthogonal to manufacture polarizing plates 1 to 9.

The optical film in each of Examples showed a sufficient bonding property of the optical film and polarizing plate protective film of the present invention with polarizer regardless of which one of bonding methods A and B was employed, and had an excellent polarizing plate processing suitability.

(Evaluation of Display Performance in IPS type Liquid Crystal Display Device)

From a commercially available LCD TV (IPS mode slim-type 42-inch LCD TV), polarizing plates having a liquid crystal cell interposed between the polarizing plates were peeled off, and the polarizing plates manufactured by the above described method were re-bonded to the liquid crystal cell by a sticking agent so that an optical film side of each example is arranged at the liquid crystal cell side. The re-assembled LCD TV was maintained under an environment of 50° C. and 80% RH for 3 days, transferred to an environment of 25° C. and 60% RH, and was continuously lit in a black display state. After 48 hours, through observation with eyes, a light unevenness was evaluated.

In the observation at the front side of the device, when the luminance unevenness was observed in the black display, it was found that the unevenness was hardly visually recognized under an environment of illumination of 100 1x.

What is claimed is:

1. An optical film comprising:
a (meth)acrylic resin having a cyclic structure in its main chain as a main component,
a compound represented by Formula (1) below, and
a rubber elastic body:

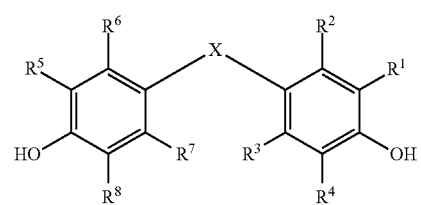

Formula (1)

wherein
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms, and the alicyclic group represented by X may have at least one substituent selected from a halogen atom, an aliphatic hydrocarbon group having 1 to 12 carbon atoms and an aromatic hydrocarbon group having 6 to 15 carbon atoms, and
wherein the content of the compound represented by Formula (1) is 8 parts by mass or more, and 50 parts by mass or less based on 100 parts by mass of (meth)acrylic resin.

2. The optical film according to claim 1,
wherein the rubber elastic body is a (meth)acrylic rubber.

3. The optical film according to claim 1,
wherein each of $R^2$, $R^3$, $R^4$, $R^6$, $R^7$ and $R^8$ in Formula (1) represents a hydrogen atom.

4. The optical film according to claim 1,
wherein each of $R^1$ and $R^5$ in Formula (1) independently represents a hydrogen atom or a methyl group.

5. The optical film according to claim 1,
wherein X in Formula (1) is represented by Formula (X1) or Formula (X2) below:

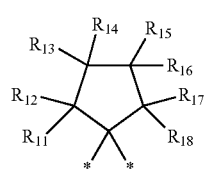

Formula (X1)

wherein in Formula (X1),
each of $R_{11}$ to $R_{18}$ independently represents a hydrogen atom or a hydrocarbon group having 1 to 6 carbon atoms, at least two of $R_n$ to $R_{18}$ may be linked to each other to form an alicyclic ring having 8 or less carbon atoms, and
* represents a binding site:

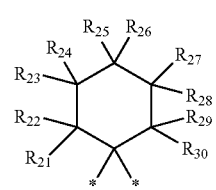

Formula (X2)

wherein in Formula (X2), each of $R_{21}$ to $R_{30}$ independently represents a hydrogen atom or a hydrocarbon group having 1 to 6 carbon atoms, at least two of $R_{21}$ to $R_{30}$ may be linked to each other to form an alicyclic ring having 8 or less carbon atoms, and

* represents a binding site.

6. The optical film according to claim 5,
wherein each of $R_{11}$ to $R_{18}$ in Formula (X1) and $R_{21}$ to $R_{30}$ in Formula (X2) independently represents a hydrogen atom or a methyl group.

7. The optical film according to claim 1,
wherein the (meth)acrylic resin having a cyclic structure in its main chain has at least one cyclic structure selected from the following Formulas (101) to (104) below:

Formula (101)

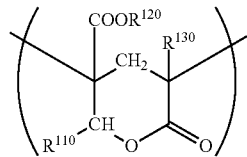

wherein in Formula (101),
each of $R^{110}$, $R^{120}$ and $R^{130}$ independently represents a hydrogen atom or an alkyl group having 1 to 20 carbon atoms, and the alkyl group may further have an oxygen atom:

Formula (102)

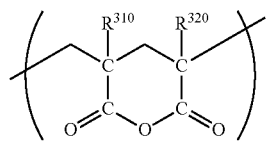

wherein in Formula (102),
each of $R^{310}$ and $R^{320}$ independently represents a hydrogen atom or an alkyl group having 1 to 20 carbon atoms, and the alkyl group may have an oxygen atom:

Formula (103)

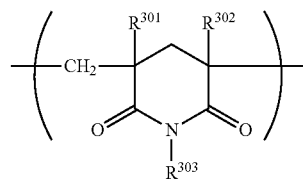

wherein in Formula (103),
each of $R^{301}$, $R^{302}$ and $R^{303}$ independently represents a hydrogen atom or an unsubstituted or substituted alkyl group having 1 to 12 carbon atoms, a cycloalkyl group or an aryl group:

Formula (104)

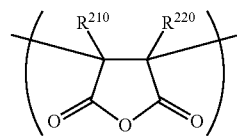

wherein in Formula (104),
each of $R^{210}$ and $R^{220}$ independently represents a hydrogen atom or an organic residue having 1 to 20 carbon atoms.

8. A polarizing plate protective film having the optical film according to claim 1.

9. A polarizing plate having the polarizing plate protective film according to claim 8.

10. A liquid crystal display device provided with the polarizing plate according to claim 9.

* * * * *